US008352267B2

(12) United States Patent
Suzuki

(10) Patent No.: US 8,352,267 B2
(45) Date of Patent: Jan. 8, 2013

(54) INFORMATION PROCESSING SYSTEM AND METHOD FOR READING CHARACTERS ALOUD

(75) Inventor: Toshiaki Suzuki, Kyoto (JP)

(73) Assignee: Nintendo Co., Ltd., Minami-Ku, Kyoto (JP)

( * ) Notice: Subject to any disclaimer, the term of this patent is extended or adjusted under 35 U.S.C. 154(b) by 1185 days.

(21) Appl. No.: 11/819,402

(22) Filed: Jun. 27, 2007

(65) Prior Publication Data

US 2008/0281597 A1 Nov. 13, 2008

(30) Foreign Application Priority Data

May 7, 2007 (JP) ................................. 2007-122668

(51) Int. Cl.
*G10L 13/00* (2006.01)

(52) U.S. Cl. ........................................ 704/258; 704/270

(58) Field of Classification Search .................. 704/258, 704/270

See application file for complete search history.

(56) References Cited

U.S. PATENT DOCUMENTS

| | | | | |
|---|---|---|---|---|
| 5,136,504 | A * | 8/1992 | Fushimoto | 704/10 |
| 6,334,106 | B1 * | 12/2001 | Mizuno et al. | 704/260 |
| 6,881,147 | B2 * | 4/2005 | Naghi et al. | 463/35 |
| 7,351,148 | B1 * | 4/2008 | Rothschild et al. | 463/30 |
| 2001/0041328 | A1 * | 11/2001 | Fisher | 434/157 |
| 2003/0046082 | A1 * | 3/2003 | Siegel | 704/270 |
| 2005/0108646 | A1 * | 5/2005 | Willins et al. | 715/723 |
| 2005/0137872 | A1 * | 6/2005 | Brady | 704/269 |
| 2006/0019745 | A1 * | 1/2006 | Benbrahim | 463/29 |
| 2006/0166172 | A1 * | 7/2006 | May | 434/185 |
| 2006/0233389 | A1 * | 10/2006 | Mao et al. | 381/92 |
| 2006/0239471 | A1 * | 10/2006 | Mao et al. | 381/92 |
| 2006/0252541 | A1 * | 11/2006 | Zalewski et al. | 463/36 |
| 2007/0211071 | A1 * | 9/2007 | Slotznick et al. | 345/594 |
| 2007/0218987 | A1 * | 9/2007 | Van Luchene et al. | 463/30 |
| 2008/0059145 | A1 * | 3/2008 | Wood et al. | 704/2 |
| 2008/0180283 | A1 * | 7/2008 | Nordenhake | 341/22 |
| 2008/0268931 | A1 * | 10/2008 | Alderucci et al. | 463/11 |
| 2008/0300055 | A1 * | 12/2008 | Lutnick et al. | 463/39 |

FOREIGN PATENT DOCUMENTS

| | | |
|---|---|---|
| JP | 09-282137 | 10/1997 |
| JP | A H11-338633 | 12/1999 |
| JP | 2006-201912 | 8/2006 |

OTHER PUBLICATIONS

Japanese Office Action (Notice of Reasons for Rejection) issued for corresponding Japanese Patent Application No. 2007-122668, dated Sep. 11, 2012.

* cited by examiner

*Primary Examiner* — Jakieda Jackson
(74) *Attorney, Agent, or Firm* — Nixon & Vanderhye P.C.

(57) ABSTRACT

A plurality of input devices each includes a speaker, an operation data transmitter, a voice data receiver, and a voice controller. An information processing apparatus includes a voice storing area, object displaying programmed logic circuitry, operation data acquiring programmed logic circuitry, pointing position determining programmed logic circuitry, object specifying programmed logic circuitry, voice reading programmed logic circuitry, and voice data transmitting programmed logic circuitry. The pointing position determining programmed logic circuitry specifies, for each of the input devices, a pointing position on a screen based on operation data transmitted from the operation data transmitter. The voice reading programmed logic circuitry reads voice data corresponding to the pointing position for each of the input devices. The voice data transmitting programmed logic circuitry transmits the voice data to each of the input devices. The voice controller outputs voice from the speaker based on the voice data.

30 Claims, 18 Drawing Sheets

F I G. 5
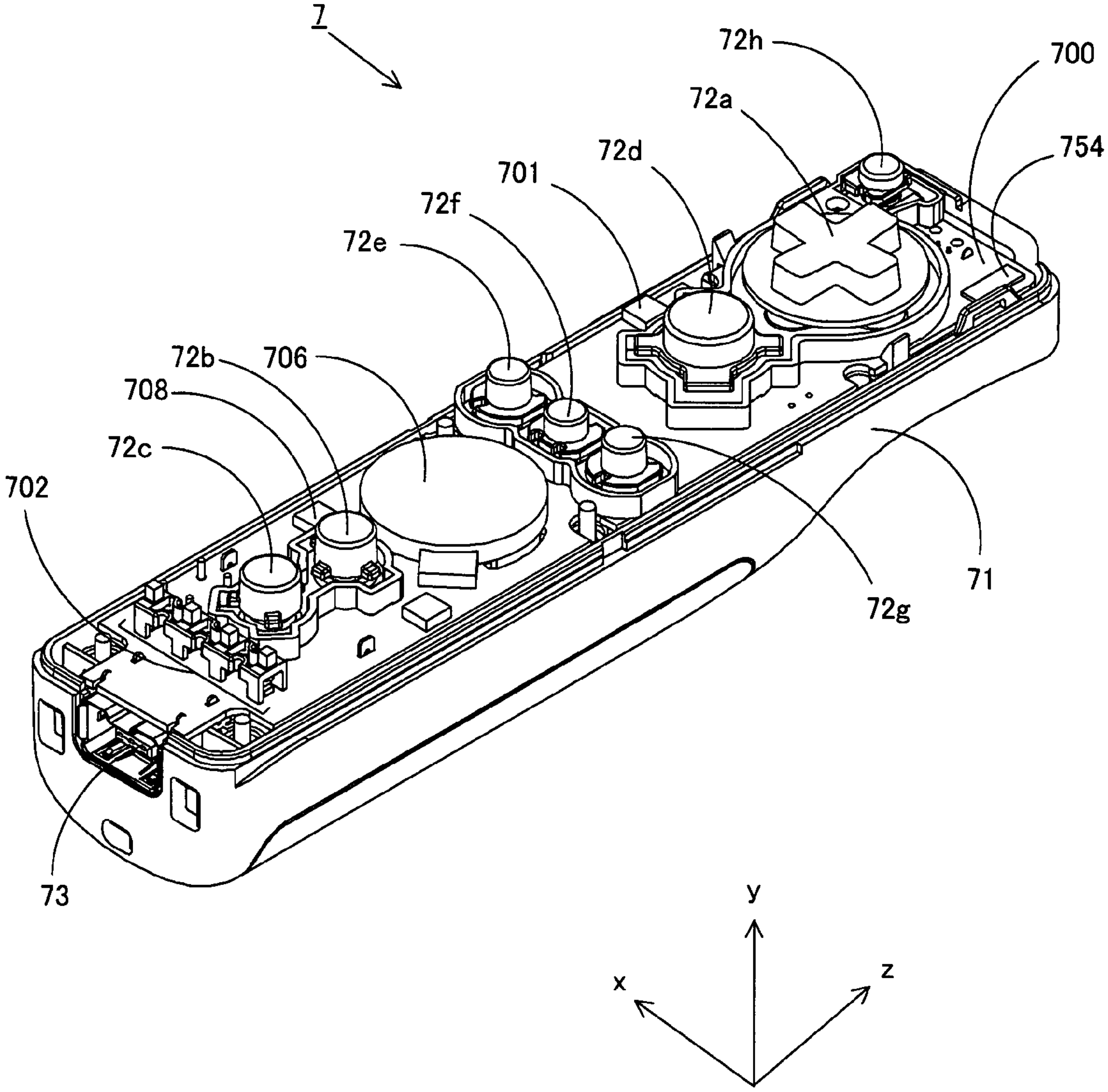

F I G. 6
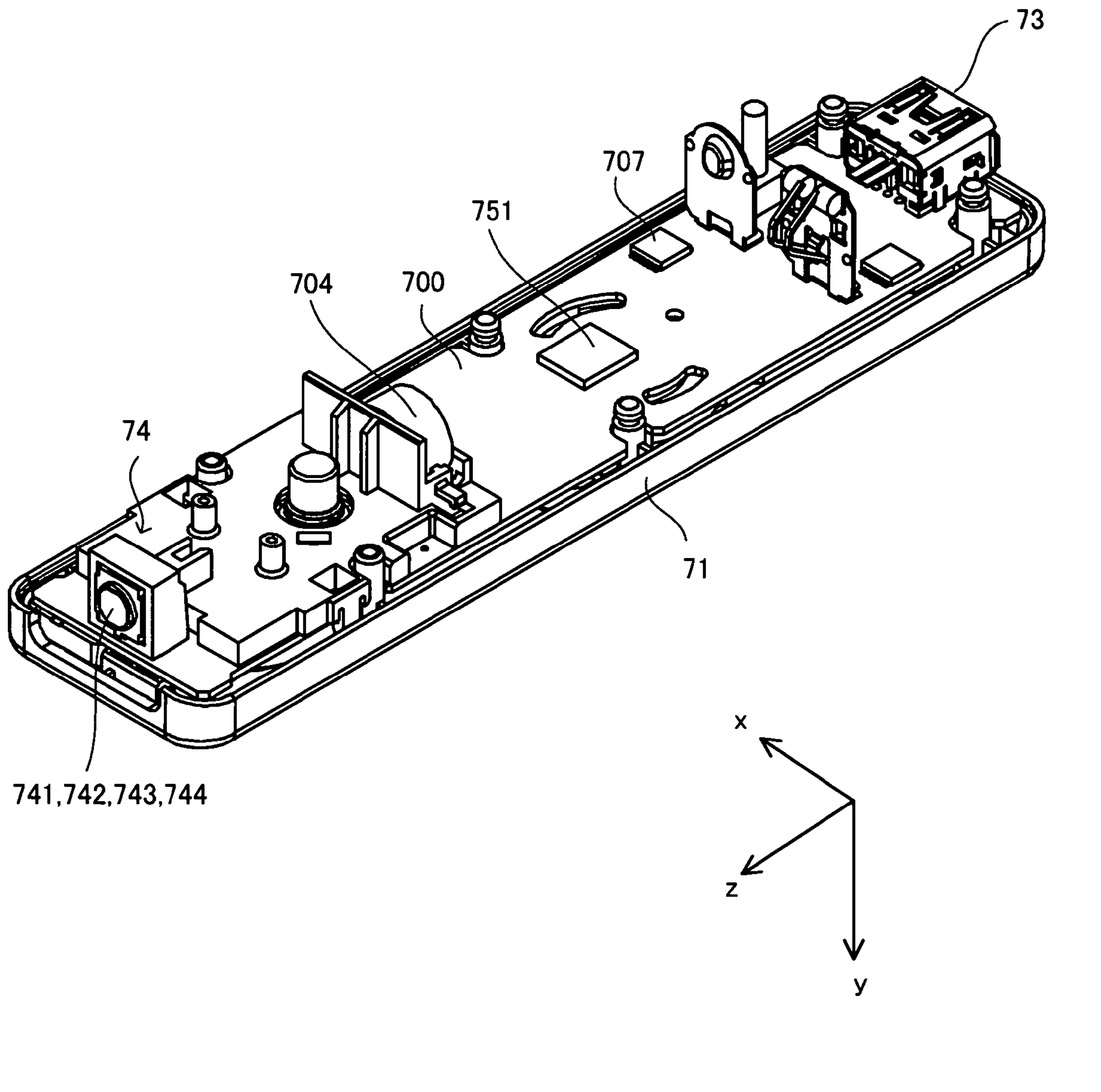

203 303

<ruby>能</>のう</ruby>ある<ruby>鷹</>たか</ruby>は<ruby>
爪</>つめ</ruby>を<ruby>隠す</>かくす</ruby>とは、<ruby>
本当</>ほんとう</ruby>に<ruby>実力</>じつりょく</ruby>の
あるものはあまりそのことを<ruby>表</>おもて</ruby>に出さ
ないものだということの<ruby>例え</>たとえ</ruby>です。

128

| CONTROLLER ID (1281) | POINTING COORDINATES (1282) | TRANSMITTED FLAG (1283) | VOICE DATA (1284) |
|---|---|---|---|
| 1 | (320.200) | OFF | xxxxxxxx |
| 2 | (420,100) | OFF | xxxxxxxxxx |
| ⋮ | ⋮ | ⋮ | ⋮ |

| RUBY NUMBER | PRONUNCIATION |
|---|---|
| 1 | のう |
| 2 | たか |
| 3 | つめ |
| 4 | かくす |
| 5 | ほんとう |
| 6 | じつりょく |
| 7 | おもて |
| 8 | たとえ |

| COORDINATES ON TEXT OBJECT | RUBY NUMBER |
|---|---|
| (75,75,100)～(100,100,100) | 1 |
| (175,75,100)～(200,100,100) | 2 |
| ⋮ | ⋮ |
| (575,300,100)～(575,325,100) | 8 |
| (75,326,100)～(100,350,100) | 8 |

| OBJECT ID | RUBY NUMBER |
|---|---|
| 1 | 1 |
| 2 | 2 |
| 3 | 3 |
| ⋮ | ⋮ |
| 8 | 8 |
| 9 | 8 |

INFORMATION PROCESSING SYSTEM AND METHOD FOR READING CHARACTERS ALOUD

CROSS REFERENCE TO RELATED APPLICATION

The disclosure of Japanese Patent Application No. 2007-122668, filed May 7, 2007, is incorporated herein by reference.

BACKGROUND

1. Field

Example embodiments of the present invention relate to an information processing system, comprised of a plurality of input devices and an information processing apparatus which executes a predetermined information processing based on an operation performed by a user using each of the input devices, and to a storage medium storing an information processing program. More particularly, example embodiments of the present invention relates to an information processing system capable of reading aloud a character displayed on a screen and a storage medium storing an information processing program.

2. Description of the Background Art

Conventionally, a sentence reading apparatus which reads aloud a text displayed on a screen (Japanese Laid-Open Patent Publication No. 9-282137) exists. In such a sentence reading apparatus, a plurality of display controlling sections are provided so as to simultaneously display a plurality of sentences on a single display, and only one reading section is provided. When the reading section is not reading aloud a sentence, a request, for changing a work to be read aloud, which is issued from the display controlling section is accepted. On the other hand, when the reading section is reading aloud the sentence, the request for changing the work to be read aloud is denied.

However, in the aforementioned sentence reading apparatus disclosed in Japanese Laid-Open Patent Publication No. 9-282137, two or more sentences cannot be read aloud simultaneously. Therefore, despite that the plurality of sentences can be simultaneously displayed, the sentences cannot be simultaneously used. For example, a plurality of users cannot simultaneously use the sentences.

SUMMARY

Therefore, one aspect of example embodiments of the present invention is to provide an information processing system capable of simultaneously reading aloud characters respectively desired by a plurality of users.

Example embodiments of the present invention have the following features to attain the aspect mentioned above. Note that reference numerals and figure numbers are shown in parentheses below for assisting a reader in finding corresponding components in the figures to facilitate the understanding of example embodiments of the present invention, but they are in no way intended to restrict the scope of the invention.

A first aspect of example embodiments of the present invention is an information processing system comprised of a plurality of input devices (7) and an information processing apparatus (3) for executing a predetermined information processing based on an operation performed by a user using each of the plurality of input devices and for displaying an image in a display area (2) of a display device based on the information processing. Each of the plurality of input devices includes a speaker (706), operation data transmitting means (75), voice data receiving means (75), and voice controlling means (707). The operation data transmitting means transmits operation data including pointing data designating a position in the display area based on a predetermined operation input. The voice data receiving means receives voice data representing voice to be outputted from the speaker from the information processing apparatus. The voice controlling means outputs the voice from the speaker based on the received voice data. Also, the information processing apparatus includes voice storing means (12), voice displaying means (10), operation data acquiring means (10), pointing position determining means (10), object specifying means (10), voice reading means (10), and voice data transmitting means (19). The voice storing means stores predetermined voice data. The object displaying means displays at least one object associated with the predetermined voice data in the display area. The operation data acquiring means acquires the operation data for each of the plurality of input devices. The pointing position determining means determines, for each of the plurality of input devices, a pointing position in the display area based on the pointing data included in the acquired operation data. The object specifying means specifies, for each of the plurality of input devices, one of the at least one object displayed at the pointing position. The voice reading means reads the voice data associated with the specified object. The voice data transmitting means transmits the voice data read by the voice reading means to each of the input devices pointing to the specified object.

According to the first aspect, in the case where a plurality of players each operates a common screen by using the input device having the speaker, when each of the plurality of players points to a predetermined object displayed on the screen, the voice corresponding to the predetermined object is outputted from the speaker of each of the players. Therefore, each of the plurality of players can simultaneously hear voice output corresponding to the object located at a position desired by each of the players, e.g., each of the plurality of players can simultaneously hear a different sentence read aloud. Furthermore, the voice is outputted from the input device of each of the players. Thus, it becomes possible to prevent the voices being produced from being mixed up with each other and then becoming difficult to hear.

In a second aspect based on the first aspect, the voice reading means includes voice synthesizing means for generating, for each of the plurality of input devices, synthesized voice data by performing voice synthesis based on the voice data read by the voice storing means. The voice data transmitting means transmits the synthesized voice data generated by the voice synthesizing means to each of the plurality of input devices pointing to the specified object.

According to the second aspect, the voice data is generated by performing the voice synthesis, thereby making it possible to decrease a data amount as compared with when a human voice or the like is previously recorded and stored.

In a third aspect based on the second aspect, the at least one object includes character data representing a character displayed in the display area. The voice storing means stores the voice reciting a pronunciation of the character represented by the character data. The voice synthesizing means retrieves the voice reciting the pronunciation of the character represented by the character data included in the specified object from the voice storing means, and generates, as the synthesized voice data, synthesized voice reciting a predetermined character string composed of a plurality of characters by performing the voice synthesis based on the pronunciation of the character.

According to the third aspect, a character or sentence displayed on the screen can be read aloud by performing the voice synthesis.

In a forth aspect based on the first aspect, each of the plurality of input devices further includes imaging means (74) for picking up a predetermined imaging target. The operation data transmitting means transmits, as the pointing data, data indicating a position at which the predetermined imaging target is shown in an image picked up by the imaging means.

According to the fourth aspect, in the case of pointing to a position on the screen desired by each of the players, an intuitive operation can be performed to point to the position.

In an fifth aspect based on the first aspect, the operation data transmitting means transmits key data, included in the operation data, indicating that a predetermined key input operation is performed. The information processing apparatus further includes detection means and selection means. The detection means detects that the predetermined key input operation is performed based on the key data. The selection means executes, when the predetermined key input operation is performed, a process for selecting one of the at least one object specified by each of the plurality of input devices in which the predetermined key input operation is performed, so as to be associated with the each of the plurality of input devices.

According to the fifth aspect, from among multiple choices displayed on the screen, one choice desired by each of the players can be read aloud. Furthermore, by performing the predetermined operation, a selection of the one choice desired by each of the players can be determined. Thus, the user can determine one choice to be selected after confirming the one choice by hearing its contents read aloud.

In a sixth aspect based on the first aspect, the information processing apparatus further includes voice output stop signal transmitting means for transmitting, to each of the plurality of input devices, a voice output stop signal for stopping the voice being outputted from the each of the plurality of input device, when the pointing position of each of the plurality of input devices to which the voice data is transmitted by the voice data transmitting means indicates a position outside a display area of the specified object.

According to the sixth aspect, as a result of pointing to a predetermined object, even while voice corresponding to the predetermined object is being outputted, the voice output can be stopped when the object is no longer being pointed to.

In a seventh aspect based on the third aspect, the information processing system further comprises pronunciation image generating means for generating an image displaying the pronunciation of the character string included in the specified object, and pronunciation image displaying means for displaying the image displaying the pronunciation of the character string in a vicinity of a display position of the specified object.

According to a seventh aspect, in addition to outputting a predetermined word or the like by voice, a pronunciation of the predetermined word can be displayed. Therefore, the pronunciation of the word or the like can be presented to the user.

An eighth aspect is an information processing program instructing a computer of an information processing apparatus to execute a predetermined information processing based on operations performed by users respectively using a plurality of input devices and to display an image in a display area of a display device based on the information processing, each input device including a speaker; operation data transmitting means for transmitting operation data including pointing data designating a position in the display area of the display device; voice data receiving means for receiving voice data representing voice to be outputted from the speaker from the information processing apparatus; and voice controlling means for outputting the voice from the speaker based on the received voice data. The information processing program instructs the computer to execute an object displaying step (S2), an operation data acquiring step (S31), a pointing position determining step (S31), an object specifying step (S32), a voice reading step (S53), a voice synthesizing step (S53), and a voice data transmitting step (S54). The object displaying step displays at least one object associated with predetermined voice data stored in a predetermined storage means. The operation data acquiring step acquires the operation data for each of the plurality of input devices. The pointing position determining step determines, for each of the plurality of input devices, a pointing position in the display area based on the pointing data included in the acquired operation data. The object specifying step specifies, for each of the plurality of input devices, one of the at least one object displayed at the pointing position. The voice reading step reads the voice data associated with the specified object from the voice storing means. The voice synthesizing step generates synthesized voice data by performing voice synthesis based on the read voice data. The voice data transmitting step transmits the synthesized voice data to each of the plurality of input devices pointing to the specified object.

According to the eighth aspect, an effect similar to that of the first aspect can be obtained.

A ninth aspect is a storage medium storing a program instructing a computer of an information processing apparatus to execute a predetermined information processing based on operations performed by users respectively using a plurality of input devices and to display an image in a display area of a display device based on the information processing, each input device including a speaker; operation data transmitting means for transmitting operation data including pointing data designating a position in the display area of the display device; voice storing means for storing predetermined voice data; voice designation data receiving means for receiving voice designation data representing voice to be outputted from the speaker from the information processing apparatus; and voice controlling means for retrieving the voice data corresponding to the received voice designation data from the voice storing means and for outputting the retrieved voice data from the speaker. The program instructs the computer to execute an object displaying step (S2), an operation data acquiring step (S31), a pointing position determining step (S31), an object specifying step (S32), and a voice data transmitting step (S54). The object displaying step displays at least one object associated with the predetermined voice data in the display area. The operation data acquiring step acquires the operation data for each of the plurality of input devices. The pointing position determining step determines, for each of the plurality of input devices, a pointing position in the display area based on the pointing data included in the acquired operation data. The object specifying step specifies, for each of the plurality of input devices, one of the at least one object displayed at the pointing position. The voice data transmitting step transmits the voice designation data representing the voice data associated with the specified object to each of the plurality of input devices pointing to the specified object.

According to the ninth aspect, an effect similar to that of the eighth aspect can be obtained. Furthermore, voice pointing data is transmitted to each of the input devices, thereby making it possible to decrease a load imposed on communication between the information processing apparatus and each of the input devices, as compared with when voice data having a relatively large data size is transmitted.

A tenth aspect is an information processing system comprised of a plurality of input devices (7) and an information processing apparatus (3) for executing a predetermined information processing based on an operation performed by a user using the plurality of the input devices and for displaying an image in a display area of a display device (2) based on the information processing. Each of the plurality of input devices includes a speaker (706), operation data transmitting means (75), voice storing means (752), voice designation receiving means (75), and voice controlling means (707). The operation data transmitting means transmits operation data including pointing data designating a position in the display area based on a predetermined operation input. The voice storing means stores predetermined voice data. The voice designation data receiving means receives voice designation data representing voice to be outputted from the speaker from the information processing apparatus. The voice controlling means retrieves the voice data corresponding to the received voice designation data from the voice storing means and outputs the retrieved voice data from the speaker. Also, the information processing apparatus includes object displaying means (10), operation data acquiring means (10), pointing position determining means (10), object specifying means (10), and voice data transmitting means (19). The object displaying means displays at least one object associated with the predetermined voice data in the display area. The operation data acquiring means acquires the operation data for each of the plurality of input devices. The pointing position determining means determines, for each of the plurality of input devices, a pointing position in the display area based on the pointing data included in the acquired operation data. The object specifying means specifies, for each of the plurality of input devices, one of the at least one object displayed at the pointing position. The voice data transmitting means transmits the voice designation data representing the voice data associated with the specified object to each of the plurality of input devices pointing to the specified object.

According to the tenth aspect, an effect similar to that of the ninth aspect can be obtained.

According to example embodiments of the present invention, when an object, on one screen, which is desired by each of the players is pointed to, each of the plurality of players can simultaneously hear voice output corresponding to the object located at a position desired by each of the players, e.g., each of the plurality of players can simultaneously hear a different sentence read aloud. Furthermore, the voice is outputted from the input device of each of the players. Thus, it becomes possible to prevent the voices being produced from being mixed up with each other and then becoming difficult to hear.

These and other features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 5 is a perspective view of the controller 7 in a state where an upper casing thereof is removed;

FIG. 6 is a perspective view of the controller 7 in a state where a lower casing thereof is removed;

FIG. 17 is a diagram illustrating an exemplary ruby word list generated in a work area 127;

FIG. 18 is a diagram illustrating an exemplary ruby word position table generated in the work area 127;

FIG. 19 is a diagram illustrating an exemplary hit determination table generated in the work area 127;

DESCRIPTION OF NON-LIMITING, EXAMPLE EMBODIMENTS

Hereinafter, example embodiments of the present invention will be described with reference to the drawings.

First Embodiment

Overall Configuration of Game System

Figure 1:
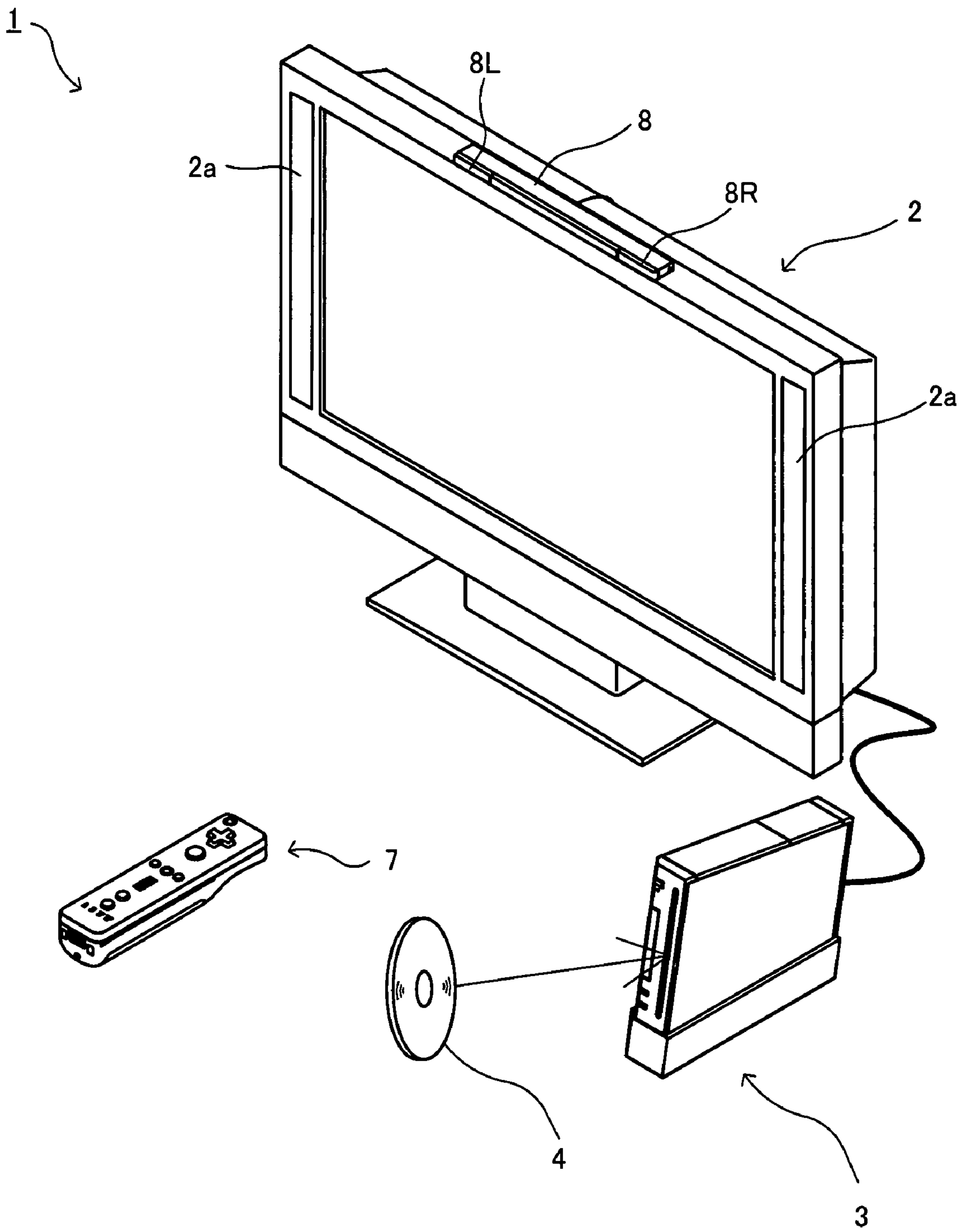
FIG. 1 is an external view illustrating a game system 1 according to an example embodiment of the present invention.

With reference to FIG. 1, a game system 1 including a game apparatus according to the example embodiments of the present invention will be described. FIG. 1 is an external view illustrating the game system 1. Hereinafter, the game apparatus and a game program of example embodiments of the present invention will be described by using a stationary game apparatus as an example. In FIG. 1, the game system 1 includes a television receiver (hereinafter simply referred to as "television") 2, a game apparatus 3, an optical disc 4, a controller 7, and a marker section 8. The present system causes the game apparatus 3 to execute game processing in accordance with a game operation using the controller 7.

To the game apparatus 3, the optical disc 4, which is an exemplary information storage medium exchangeably used for the game apparatus 3, is detachably inserted. On the optical disc 4, a game program to be executed by the game apparatus 3 is stored. An insertion slot for the optical disc 4 is provided at the front face of the game apparatus 3. The game apparatus 3 executes game processing by reading and executing the game program stored on the optical disc 4 inserted through the insertion slot.

To the game apparatus 3, the television 2, which is an exemplary display apparatus, is connected via a connection cord. The television 2 displays a game image obtained as a result of the game processing executed by the game apparatus 3. Further, on the periphery of a screen of the television 2 (an upper side of the screen in FIG. 1), the marker section 8 is provided. The marker section 8 has two markers 8R and 8L located at both ends thereof. The marker 8R (as well as the marker 8L) is specifically composed of one or more infrared LEDs, and outputs infrared light forward from the television 2. The marker section 8 is connected to the game apparatus 3, and the game apparatus 3 is capable of controlling lighting of respective red infrared LEDs contained in the marker section 8.

The controller 7 is an input device for providing the game apparatus 3 with operation data representing a content of an operation applied to the controller 7. The controller 7 and the game apparatus 3 are connected to each other by wireless communication. In the present embodiment, a technique of Bluetooth (registered trademark), for example, is used for the wireless communication between the controller 7 and the game apparatus 3. In another embodiment, the controller 7 and the game apparatus 3 may be connected to each other via a fixed line.

(Internal Configuration of Game Apparatus 3)

Figure 2:
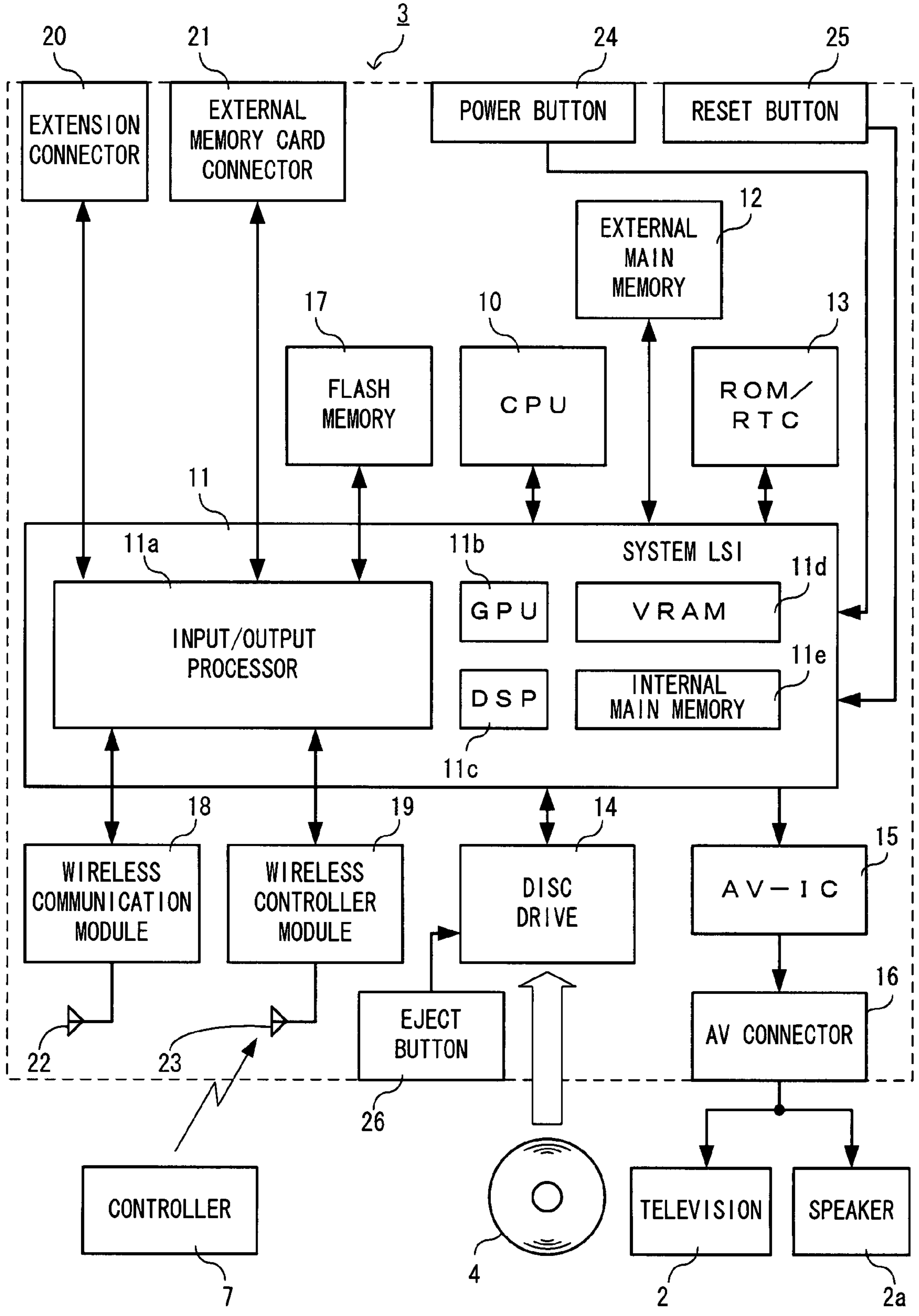
FIG. 2 is a functional block diagram illustrating a configuration of a game apparatus 3.

Next, with reference to FIG. 2, an internal configuration of the game apparatus 3 will be described. FIG. 2 is a functional block diagram illustrating a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by causing the game program stored on the optical disc 4 to be executed, and functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as control of data transmission between respective component parts connected thereto, generation of an image to be displayed, and obtainment of data from an external apparatus. An internal configuration of the system LSI will be described later. The external main memory 12, which is of a volatile type, stores programs such as a game program read from the optical disc and the flash memory 17, and other various data, and is used as a work area and buffer space for the CPU 10. The ROM/RTC 13 includes a ROM (so-called a boot ROM) incorporating a program booting the game apparatus 3, and a clock circuit for counting time (RTC: Real Time Clock). The disc drive 14 reads, from the optical disc 4, the program data, texture data and the like, and writes the read data into an internal main memory lie described later, or the external main memory 12.

Further, provided in the system LSI 11 are an input/output processor 11*a*, a GPU (Graphics Processor Unit) 11*b*, a DSP (Digital Signal Processor) 11*c*, a VRAM 11*d*, and the internal main memory 11*e*. These component parts 11*a* to 11*e* are, though not shown in diagrams, connected to one another via an internal bus.

The GPU 11*b* forms a portion of drawing means, and generates an image in accordance with a graphics command (draw command) from the CPU 10. More specifically, the GPU 11*b* generates game image data by performing, in accordance with the graphics command, calculation processing necessary to display 3D graphics, for example, coordinate conversion from 3D coordinates to 2D coordinates, which corresponds to processing before rendering, and final rendering processing such as texture pasting. Here, the CPU 10 provides the GPU 11*b* with not only the graphics command, but also an image generation program necessary to generate the game image data. The VRAM 11*d* stores data (such as polygon data and the texture data) necessary for the GPU 11*b* to execute the graphics command. When an image is generated, the GPU 11*b* generates the image data by using the data stored in the VRAM 11*d*.

The DSP 11*c* functions as an audio processor, and generates audio data by using sound data and sound waveform (tone quality) data stored on the internal main memory 11*e* and the external main memory 12. Similarly to the external main memory 12, the internal main memory 11*e* stores programs and various data, and is used as a work area and buffer space for the CPU 10.

The image data and the audio data generated as above described, is read by the AV-IC 15. The AV-IC 15 outputs the read image data to the television 2 via an AV connector 16, and also outputs the read audio data to a speaker 2*a* embedded in the television 2. Accordingly, the image is displayed on the television 2, and the sound is outputted from the speaker 2*a*.

The input/output processor (I/O processor) 11*a* executes data transmission with component parts connected thereto and data downloading from an external apparatus. The I/O processor 11*a* is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11*a* is connected to a network via the wireless communication module 18 and the antenna 22 and is capable of communicating with other game apparatuses or various servers connected to the network. The I/O processor 11*a* accesses the flash memory 17 at regular intervals so as to detect data, if any, necessary to transmit to the network. If the data is detected, the detected data is transmitted to the network via the wireless communication module 18 and the antenna 22. Further, the I/O processor 11*a* receives data transmitted from the other game apparatuses or downloaded from a download server via the network, the antenna 22 or the wireless communication module 18, and stores the received data in the flash memory 17. The CPU 10 executes the game program so as to read the data stored in the flash memory 17 and causes the game program to use the read data. In the flash memory 17, not only the data transmitted between the game apparatus 3 and the other game apparatuses or the various servers, but also save data of a game (result data or intermediate step data of the game) played by using the game apparatus 3 may be stored.

Further, the I/O processor 11*a* receives the operation data transmitted from the controller 22 via the antenna 23 and the wired controller module 19, and (temporarily) stores the operation data in the internal main memory 11*e* or in a buffer space of the external main memory 12.

Further, to the I/O processor 11*a*, the extension connector 20 and the external memory card connector 21 are connected. The extension connector 20 is a connector for an interface such as a USB and a SCSI, and is capable of performing communication with the network, instead of the wireless communication module 18, by connecting thereto a medium such as an external storage, a peripheral device such as another controller, or a wired communication connector. The external memory card connector 21 is a connector for connecting the external storage medium such as the memory card. For example, the I/O processor 11*a* accesses the external storage medium via the extension connector 20 or the external memory card connector 21, and then saves data or reads data.

Provided to the game apparatus 3 are a power button 24, a reset button, 25, and an eject button 26. The power button 24 and the reset button 25 are connected to the system LSI 11. When the power button 24 is turned on, the power is supplied to the respective components of the game apparatus 3 via an AC adapter which is not shown. Further, when the power button 24 is pressed again during the state of the power being on, the state shifts to a low-power standby mode. The power is supplied to the game apparatus 3 even in such state, and thus the game apparatus 3 can be always connected to the network such as the Internet. In the case of turning off the power after the power is turned on, it is possible to turn off the power by holding down the power button 24 for a predetermined time period or longer. When the reset button 25 is pressed, the system LSI 11 reactivates a start-up program of the game apparatus 3. The eject button 26 is connected to the disc drive 14. When the eject button 26 is pressed, the optical disc 4 is ejected from the disc drive 14.

Figure 3:
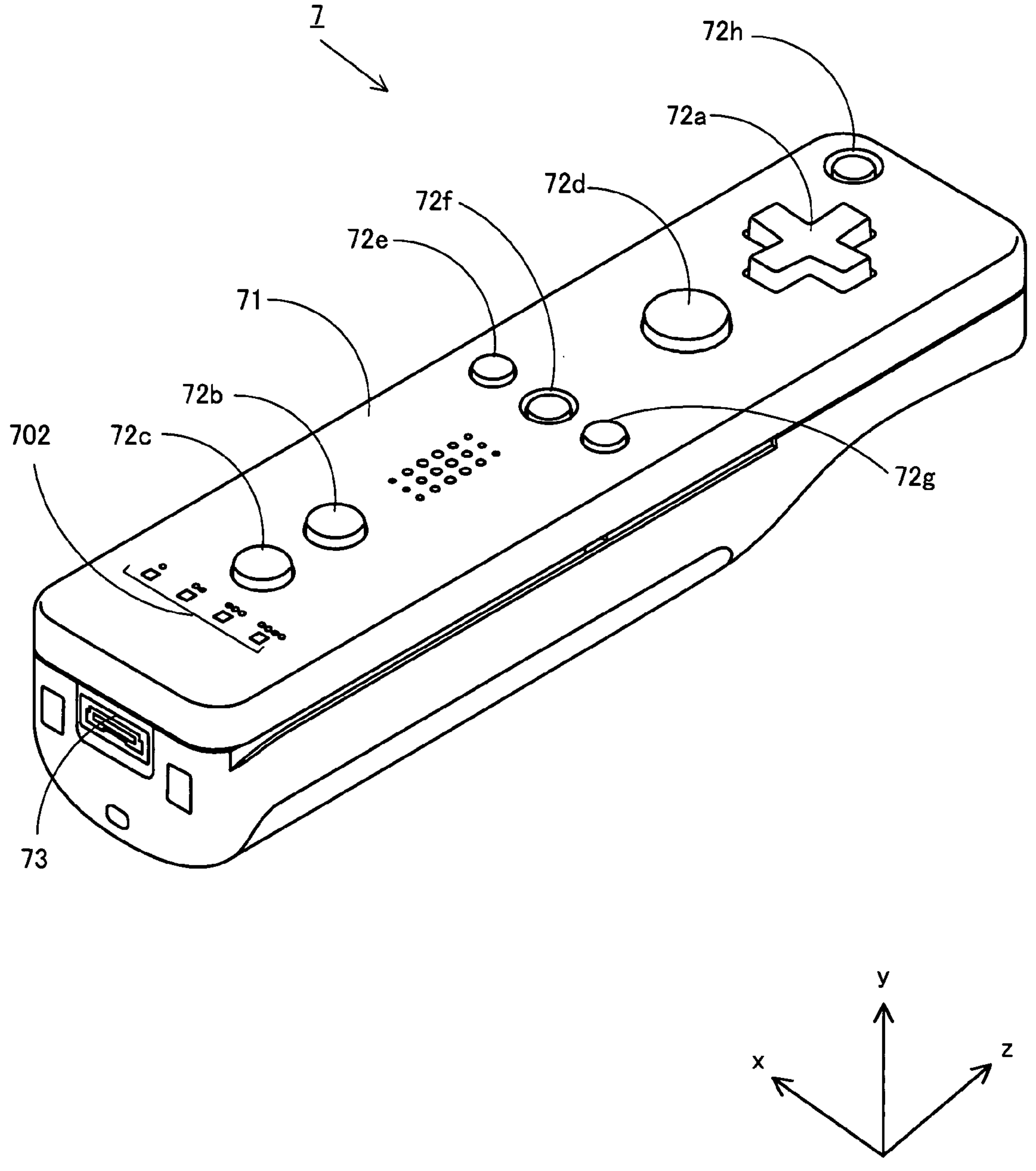
FIG. 3 is a perspective view of a controller 7 of FIG. 1 as viewed from a top rear side thereof.
Figure 4:
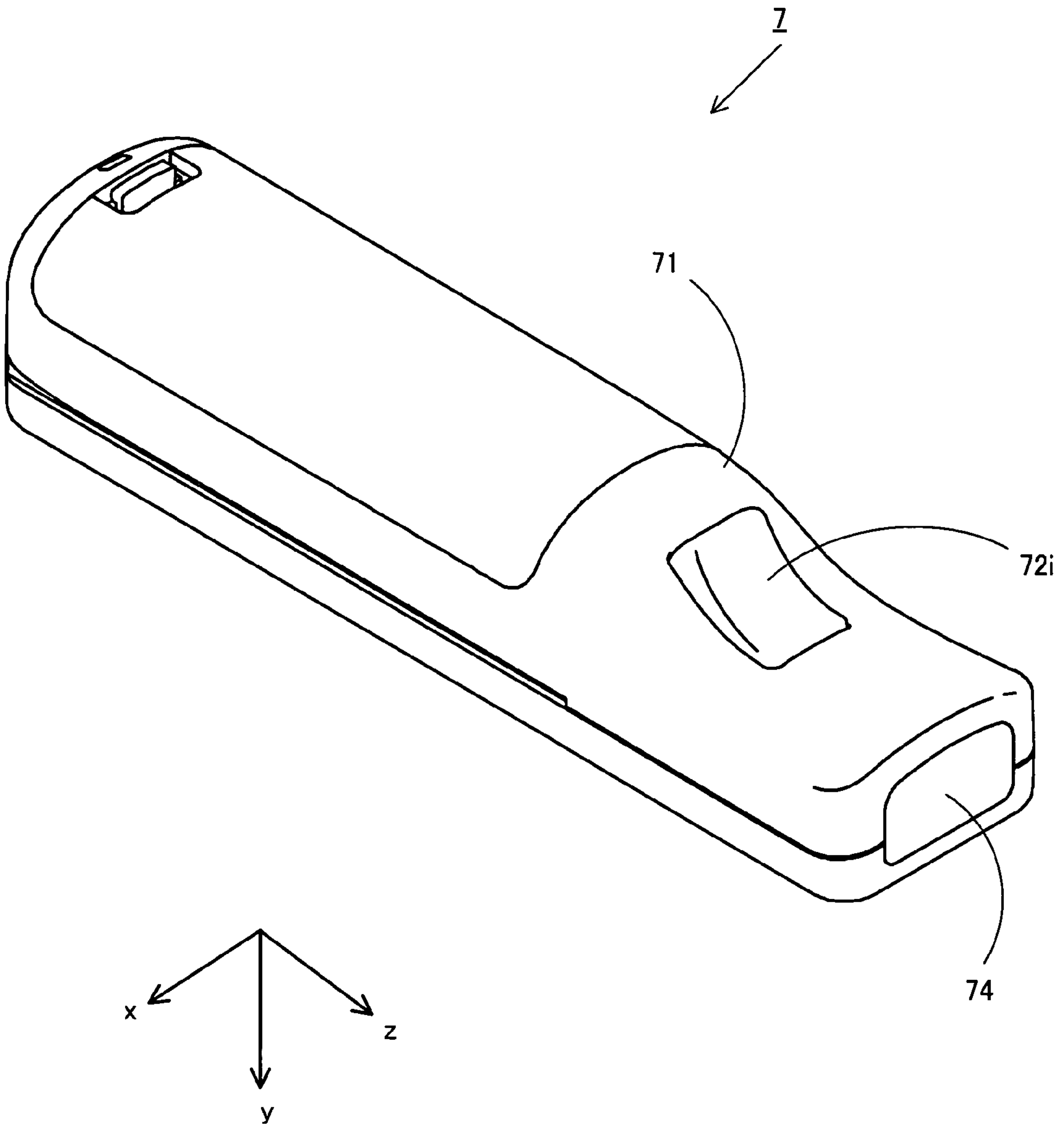
FIG. 4 is a perspective view of the controller 7 of FIG. 3 as viewed from a bottom front side thereof.

With reference to FIGS. 3 and 4, the controller 7 will be described. FIG. 3 is a perspective view of a controller 7 as viewed from a top rear side thereof. FIG. 4 is a perspective view of the controller 7 as viewed from a bottom front side thereof.

In FIGS. 3 and 4, the controller 7 includes a housing 71 and an operation section 72 composed of a plurality of operation buttons provided on the surface of the housing 71. The housing 71 of the present embodiment has a substantially parallelepiped shape extending in a longitudinal direction from front to rear, and an overall size thereof is small enough to be held by one hand of an adult or even a child. The housing 71 is formed by, for example, plastic molding.

At a front center portion of a top surface of the housing 71, a cross key 72*a* is provided. The cross key 72*a* is a cross-shaped four-direction push switch, and the operation portions thereof are respectively located on cross-shaped projecting portions arranged at intervals of 90 degrees such that the operation portions correspond to four directions (front, rear, right and left). A player selects one of the front, rear, right and left directions by pressing one of the operation portions of the cross key 72*a*. Through an operation of the cross key 72*a*, the player can, for example, indicate a direction in which a player character or the like appearing in a virtual game world is to move, or select an instruction from a plurality of choices.

The cross key 72*a* is an operation section for outputting an operation signal in accordance with the above-described direction input operation performed by the player, and such an operation section may be provided in another form. For example, the operation section may be such that four push switches are arranged in the cross directions and an operation signal is outputted by the player's pressing one of the four push switches. Further, in addition to the four push switches, a center switch may be provided at a center of the cross directions so as to provide an operation section compounded from four push switches and the center switch. Alternatively, the cross key 72*a* may be replaced with an operation section which includes an inclinable stick (so called a joystick) projecting from the top surface of the housing 71 and which outputs the operation signal in accordance with an inclining direction of the stick. Still alternatively, the cross key 72*a* may be replaced with an operation section which includes a disc-shaped member horizontally slidable and which outputs an operation signal in accordance with a sliding direction of the disc-shaped member. Still alternatively, the cross key 72*a* may be replaced with a touchpad.

Behind the cross key 72*a* on the top surface of the housing 71, a plurality of operation buttons 72*b* to 72*g* are provided. The operation buttons 72*b* to 72*g* are each an operation section for, when the player presses a head thereof, outputting an operation signal allocated thereto. For example, functions as a NO. 1 button, a NO. 2 button, an A button and the like are assigned to the operation buttons 72*b* to 72*d*. Further, functions as a minus button, a home button, a plus button and the like are assigned to the operation buttons 72*e* to 72*g*. Various operational functions are assigned to the operation buttons 72*a* to 72*g* in accordance with the game program executed by the game apparatus 3. In an exemplary arrangement shown in FIG. 3, the operation buttons 72*b* to 72*d* are arranged in a line at the center in a front-rear direction on the top surface of the housing 71. The operation buttons 72*e* to 72*g* are arranged in a line on the top surface of the housing 71 in a left-right direction between the operation buttons 72*b* and 72*d*. The operation button 72*f* has a top surface thereof buried in the top surface of the housing 71, so as not to be inadvertently pressed by the player.

In front of the cross key 72*a* on the top surface of the housing 71, an operation button 72*h* is provided. The operation button 72*h* is a power switch for turning on and off the power to the game apparatus 3 by remote control. The operation button 72*h* also has a top surface thereof buried in the top surface of the housing 71, so as not to be inadvertently pressed by the player.

Behind the operation button 72*c* on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player of the controller type which is currently set for the controller 7. Specifically, when the controller 7 transmits transmission data to a communication unit 6, one of the plurality of LEDs 702 which corresponds to the controller type of the controller 7 is lit up.

On the top surface of the housing 71, speaker holes for emitting a sound from a speaker (a speaker 706 of FIG. 5), which is to be described later, to outside are formed between the operation button 72*b* and the operation buttons 72*e* to 72*g*.

On a bottom surface of the housing 71, a recessed portion is formed. As described later in detail, the recessed portion is formed in a position in which an index finger or middle finger of the player is located when the player holds the controller 7 with one hand and points a front portion thereof to the markers 8L and 8R. On a slope surface of the recessed portion, an operation button 72*i* is provided. The operation button 72*i* is an operation section acting as, for example, a B button.

On a front side surface of the housing 71, an image pickup element 743 constituting a portion of an imaging information calculation section 74 is provided. The imaging information calculation section 74 is a system for analyzing image data picked up by the controller 7, thereby identifying an area having a high brightness in the image and detecting a position of a gravity center, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear side surface of the housing 71, a connector 73 is provided. The connector 73 is, for example, an edge connector, and is used for engaging and connecting the controller 7 with a connection cable.

For the sake of a specific description, a coordinate system set for the controller 7 will be defined. As shown in FIGS. 3 and 4, an x-axis, a y-axis, and a z-axis running at right angles to one another are defined with respect to the controller 7. Specifically, the z-axis represents a longitudinal direction of the housing 71, which corresponds to the front-rear direction of the controller 7, and a direction on the side of the front side surface (a portion on which the imaging information calculation section 74 is provided) of the controller 7 is set as a z-axis positive direction. Further, the y-axis represents an up-down direction of the controller 7, and a direction on the side of the top surface of the housing 71 is set as a y-axis positive direction. Still further, the x-axis represents the left-right direction of the controller 7, and a direction on the left side (a side which is not shown in FIG. 3, but shown in FIG. 4) of the housing 71 is set as an x-axis positive direction.

With reference to FIGS. 5 and 6, an internal structure of the controller 7 will be described. FIG. 5 is a perspective view of the controller 7 in a state where an upper casing (a portion of the housing 71) of the controller 7 is removed. FIG. 6 is a perspective view of the controller 7 in a state where a lower casing (a portion of the housing 71) of the controller 7 is removed. FIG. 6 is a perspective view of a substrate 700 as viewed from a reverse side of the substrate 700 shown in FIG. 5.

As shown in FIG. 5, the substrate 700 is fixed inside the housing 71. Provided, on a top main surface of the substrate 700, are the operation buttons 72*a* to 72*h*, an acceleration sensor 701, the LEDs 702, an antenna 754 and the like. These elements are connected to a microcomputer 751 or the like (see FIGS. 6 and 7) by lines (not shown) formed on the substrate 700 or the like. A microcomputer 751 functions as exemplary button data generation means of example embodiments of the present invention, and generates operation button data corresponding to the type of the operation button 72*a* or the like. This function is a technique in the public domain, and realized by the microcomputer 751 detecting connection/disconnection of lines which is caused by a switch mechanism such as a tactile switch located at a lower side of a key top. More specifically, when the operation button, for example, is pressed, the lines are connected, and consequently energized. The microcomputer 751 detects the lines which are energized, and generates a signal corresponding to the type of the operation button.

The wireless module 753 (see FIG. 7) and antenna 754, which are not shown, allow the controller 7 to act as a wireless controller. A quartz oscillator, which is not shown, is provided in an inside of the housing 71, and generates a reference clock of the microcomputer 751 described later. On the top main surface of the substrate 700, a speaker 706 and an amplifier 708 are provided. The acceleration sensor 701 is provide at the left side of the operation button 72*d* on the substrate 700 (that is, at a peripheral portion, instead of a center portion, on the substrate 700). Accordingly, the acceleration sensor 701 can detect, from a rotation centering on the longitudinal direction of the controller 7, acceleration caused by a centrifugal force element as well as directional variation in gravity acceleration. Accordingly, the game apparatus 3 and the like can detect, from the detected acceleration data, the rotation of the controller 7 highly sensitively in accordance with a predetermined calculation.

As shown in FIG. 6, at a front edge of a bottom main surface of the substrate 700, the image information calculation section 74 is provided. The image information calculation section 74 includes an infrared filter 741, a lens 742, the image pickup element 743 and an image processing circuit 744 which are located in this order from the front side of the controller 7. These elements are attached to the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 and the like, and outputs an audio signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704 is connected to the microcomputer 751 by the lines formed on the substrate 700, and is turned on/off in accordance with vibration data transmitted from the game apparatus 3. The controller 7 is vibrated when the vibrator 704 is turned on, and vibration is conveyed to the player holding the controller 7. Thus, a so-called vibration-feedback game is realized. The vibrator 704 is located at a relatively front side of the housing 71, and thus the housing 71 vibrates to a large extent while the player is holding the housing 71, whereby the player feels vibration sensitively.

Figure 7:
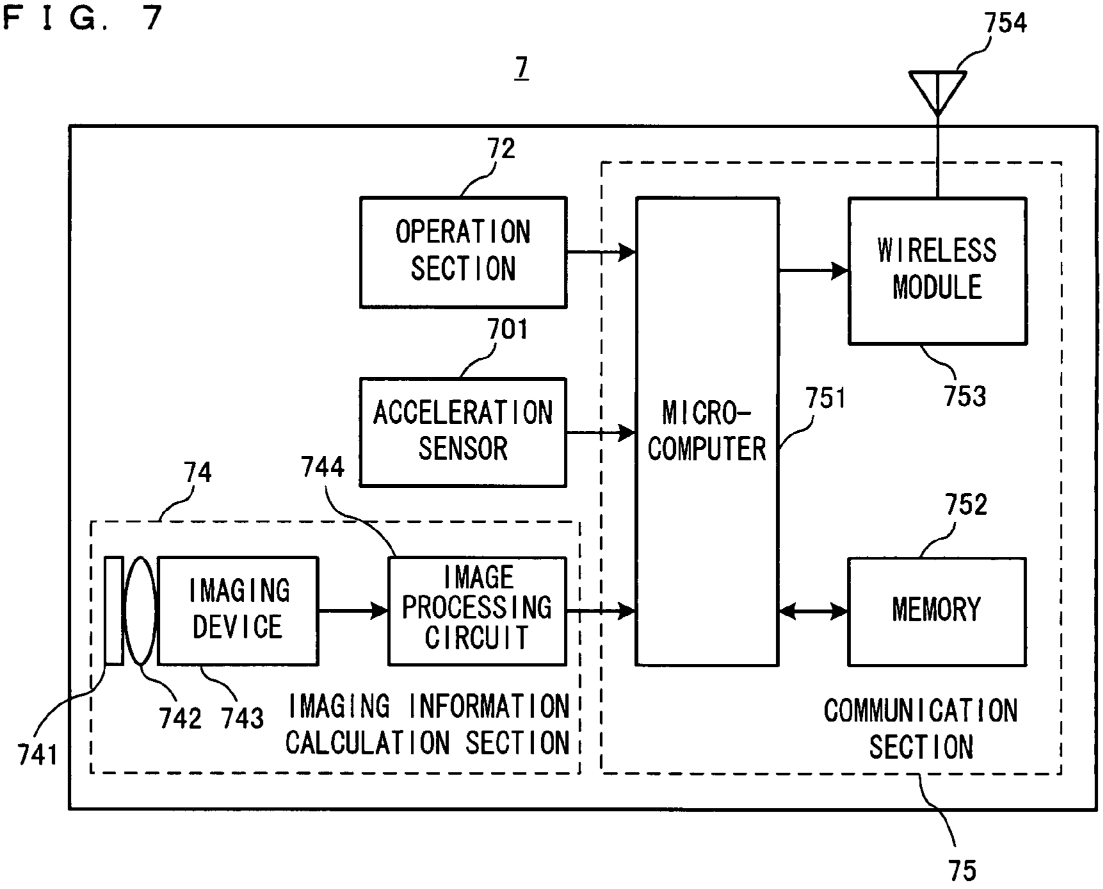
FIG. 7 is a block diagram illustrating a configuration of the controller 7 of FIG. 3.

With reference to FIG. 7, an internal configuration of the controller 7 will be described. FIG. 7 is a block diagram illustrating a configuration of the controller 7.

As shown in FIG. 7, the controller 7 includes therein a communication section 75 as well as the above-described operation section 72, the imaging information calculation section 74, the acceleration sensor 701, the vibrator 704, the speaker 706, the sound IC 707, and the amplifier 708.

The image information calculation section 74 includes the infrared filter 741, the lens 742, the image pickup element 743 and the image processing circuit 744. The infrared filter 741 allows only an infrared radiation in the light incident on the front side of the controller 7 to pass therethrough. Note that the markers 8L and 8R, located on the periphery of the display screen of the television 2, are infrared LEDs which output infrared light forward from the television 2. Therefore, by providing the infrared filter 741, images of the respective markers 8L and 8R can be more accurately picked up. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation collected by the lens 742. In other words, the image pickup element 743 picks up the image of only the infrared radiation, which has passed through the infrared filter 741, and generates image data. Hereinafter, an image picked up by the image pickup element 743 is referred to as a "picked up image". The image data generated by the image pickup element 743 is processed by the image processing circuit 744. The image processing circuit 744 calculates positions of images (of the markers 8L and 8R) to be picked up included in the picked up image. Hereinafter, with reference to FIG. 8, a method of calculating the positions of the images to be picked up will be described.

Figure 8:
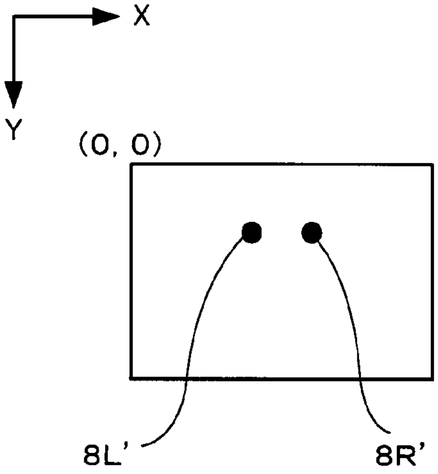
FIG. 8 is a diagram illustrating an exemplary picked up image.

FIG. 8 is a diagram illustrating an exemplary picked up image. In the picked up image shown in FIG. 8, 8L' and 8R', which are, respectively, images of the markers 8L and 8R are aligned side by side on the right and left. When the picked up image is inputted, the image processing circuit 744 calculates coordinates indicating positions of respective areas, included in the picked up image, which satisfy a predetermined condition. Here, the predetermined condition is a condition required for specifying the images to be picked up (target images). Specifically, an area satisfying the predetermined condition is an area having a brightness level higher than or equal to a predetermined value (a high brightness area), and having a size smaller than a predetermined size. Note that the predetermined condition is used only for specifying the target images. In another embodiment, the predetermined condition may include a condition relating to a color of an image.

When calculating the positions of the target images, the image processing circuit 744 specifies a high brightness area included in an area of the picked up image as a candidate area of the target image. This is because each of the target images generated based on the image data of the picked up image is shown as the high brightness area. Then, the image processing circuit 744 executes a determination process to determine, based on a size of the specified high brightness area, whether or not the high brightness area is each of the target images. In addition to the target images (i.e., the images 8L' and 8R' of the two respective markers 8L and 8R), the picked up image may include an image other than the target images due to sunlight shining in through the window or light emitted from a fluorescent lamp in the room. In this case, such an image other than the images 8L' and 8R' of the two respective markers 8L and 8R is also to be shown as the high brightness area. Therefore, by executing the determination process, the target images (i.e., the images 8L' and 8R' of the two respective markers 8L and 8R) can be distinguished from the image other than the target images. Thus, the target images can be accurately specified. Specifically, in the determination process, it is determined whether or not a size of the specified high brightness area is smaller than the predetermined size. When the size of the high brightness area is smaller than the predetermined size, the high brightness area is determined to represent each of the target images. On the other hand, when the size of the high brightness area is larger than or equal to the predetermined size, the high brightness area is determined to represent the image other than the target images.

Furthermore, based on the results of the aforementioned process, the image processing circuit 744 calculates a position of the high brightness area which has been determined to represent each of the target images. Specifically, a gravity center of the high brightness area is calculated. Note that the gravity center can be calculated at a resolution higher than a resolution of the image pickup element 743. In the present embodiment, the image pickup element 743 picks up an image at a resolution of 126×96, and calculates its gravity center at a resolution of 1024×768. That is, coordinates of the gravity center are represented by integers within a range from (0, 0) to (1024, 768). Note that a position on the picked up image is represented, as shown in FIG. 8, using a coordinate system (x-y coordinate system) in which a downward direction with respect to an upper left of the picked up image is set as the y-axis position direction, and a rightward direction with respect to the upper left of the picked up image is set as the x-axis positive direction.

As described above, the image processing circuit 744 calculates the coordinates indicating the positions of the respective areas, included in the picked up image, which satisfy the predetermined condition. Hereinafter, the coordinates calculated by the image processing circuit 744 are referred to as "marker coordinates". The marker coordinates indicate the positions of the imaged to be picked up in a coordinate system for indicating positions on a plane corresponding to the picked up image. The image processing circuit 744 outputs the marker coordinates to the microcomputer 751 of the communication section 75. The microcomputer 751 transmits data of the marker coordinates to the game apparatus 3 as the operation data. The marker coordinates vary depending on an orientation (posture) or a position of the controller 7, and thus the game apparatus 3 can calculate a pointing position varied in accordance with the orientation or the position of the controller 7 by using the marker coordinates as appropriate. In the present embodiment, the image processing circuit 41 and/or the microcomputer 751 of the controller 7 executes a process up to the calculation of the marker coordinates based on the picked up image. However, the present invention is not limited thereto. For example, the picked up image may be transmitted to the game apparatus 3, and the CPU 10 or the like of the game apparatus 3 may be caused to execute the process equivalent to processes to be executed thereafter.

Referring back to FIG. 7, it is preferable that the controller 7 includes triaxial (x, y, and z-axes) acceleration sensor 701. The triaxial acceleration sensor 701 detects linear acceleration in three directions, i.e., an up-down direction, a left-right direction, and a front-rear direction. Further, in another embodiment, a biaxial accelerometer may be used which detects the linear acceleration in the up-down direction and the left-right direction (or any other paired direction) depending on a type of a control signal to be used for game processing. For example, the triaxial or biaxial acceleration sensor 701 may be of a type available from Analog Devices, Inc. or STMicroelectronics N.V. The acceleration sensor 701 may be of an electrostatic capacitance (capacitance-coupling) type which is based on silicon micro-machined MEMS (Micro Electro Mechanical Systems) technology. Any other suitable accelerometer technology (e.g., piezoelectric type or piezoresistance type) now existing or to be developed later may be used to provide the triaxial or biaxial acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along the respective two or three axes thereof. As a result, the acceleration sensor 701 cannot directly detect motion along a non-linear (e.g. arcuate) path, rotation, rotational motion, angular displacement, tilt, position, posture or any other physical characteristic.

However, through processing by a computer such as a processor of a game apparatus (e.g., a CPU 30) or a processor of a controller (e.g., the microcomputer 751), in accordance with the acceleration signals outputted from the acceleration sensor 701, additional information relating to the controller 7 can be inferred or calculated (determined), as one skilled in the art will readily understand from the description herein. For example, in the case where processing is performed by a computer based on the assumption that a controller accommodating the acceleration sensor is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor is facing a vertically downward direction is set as a standard state, it is possible to find out whether or not the axis to be detected is tilted depending on whether or not 1G (gravitational acceleration) is exerted, and also possible to find out the degree of tilt of the axis to be detected. Further, in the case of a multi-axial acceleration sensor, it is possible to find out, in detail, the degree of tilt of respective axes with respect to the gravity direction by processing the acceleration signals along the respective axes. In this case, the processor may calculate data of a tilt angle of the controller 7 in accordance with the output from the acceleration sensor 701, or alternatively infer an approximate tilt angle in accordance with the output from the acceleration sensor 701 without calculating data of the tilt angle. By using the acceleration sensor 701 and the processor in combination with each other in a manner as above described, it is possible to identify the tilt, an posture, and the position of the controller 7. On the other hand, in the case where it is assumed that the acceleration sensor is in a dynamic state, acceleration corresponding to the motion of the acceleration sensor can be detected, in addition to the gravitational acceleration element. Accordingly, as long as the gravitational acceleration element is removed through given processing, it is possible to calculate a motion direction and the like of the controller 7. Specifically, in the case where the controller 7 including the acceleration sensor 701 is dynamically accelerated and moved by a hand of a user, various motions and/or positions of the controller 7 can be calculated by processing the acceleration signal generated by the acceleration sensor 701. Even in the case where it is assumed that the acceleration sensor is in the dynamic state, it is possible to calculate a tilt toward the gravity direction as long as the acceleration corresponding to the motion of the acceleration sensor is removed through given processing. In another embodiment, the acceleration sensor 701 may include a built-in type signal processing apparatus or a dedicated processing apparatus of any other type so as to desirably process the acceleration signal to be outputted from an embedded accelerometer before outputted to the microcomputer 751. For example, in the case where the acceleration sensor is designed to detect static acceleration (e.g., gravitational acceleration), the built-in type or the dedicated processing apparatus may convert the detected acceleration signal into a tilt angle (or any other desirable parameter) corresponding thereto.

In another embodiment, as a motion sensor for detecting the motion of the controller 7, the acceleration sensor 701, may be replaced with a gyro-sensor incorporating, for example, a rotating or vibrating element. An exemplary MEMS gyro-sensor that may be used in the embodiment is available from Analog Devices, Inc. Unlike the acceleration sensor 701, the gyro-sensor is capable of directly detecting rotation (or angular rate) around an axis of at least one gyroscopic element embedded therein. Thus, due to fundamental differences between a gyro-sensor and an acceleration sensor, processing performed on the output signals from these devices needs to be changed as appropriate, depending on which device is selected for a particular application.

Specifically, a significant change is performed in the case where the tilt and the posture are calculated by using the gyro-sensor instead of the acceleration sensor. That is, in the case of using the gyro-sensor, a value of the tilt is initialized at the time of starting detection. The angle rate data outputted from the gyro-sensor is integrated. Variation in tilt is then calculated from the initialized value of the tilt. In this case, the tilt to be calculated is a value corresponding to an angle. On the other hand, in the case where the tilt is calculated by the acceleration sensor, the tilt is calculated by comparing values of respective axes elements of the gravitational acceleration to predetermined standards corresponding thereto respectively. Accordingly, the tilt to be calculated can be represented by a vector, and thus an absolute direction detected by accelerometer can be detected without performing initialization. Further, a type of the value detected as the tilt is represented by the angle in the case of using the gyro-sensor, and is represented by the vector, on the other hand, in the case of using the acceleration sensor. Therefore, in the case of using the gyro-sensor instead of the acceleration sensor, the tilt data needs to be converted in an appropriate manner, in consideration of the difference between the two devices. Since characteristics of the gyro-sensor as well as fundamental differences between the accelerometer and the gyro-sensor are well known by the one skilled in the art, further descriptions thereof will be omitted. On the one hand, the gyro-sensor has the advantage of being capable of directly detecting rotation. On the other hand, the acceleration sensor is generally a cost-effective option as compared with the gyro-sensor when used for the controller of the present embodiment.

The communication section 75 includes the microcomputer 751, a memory 752, the wireless module 753 and the antenna 754. The microcomputer 751 controls the wireless module 753 for wirelessly transmitting the transmission data while using the memory 752 as a storage area at the time of processing. Further, the microcomputer 751 controls operation of the sound IC 707 and the vibrator 704 in accordance with the data received by the wireless module 753 from the game apparatus 3 via the antenna 754. The sound IC 707 processes the sound data and the like transmitted from the game apparatus 3 via the communication section 75. Further, the microcomputer 751 actuates the vibrator 704 in accordance with vibration data (e.g., a signal for turning the vibrator 704 "ON" or "OFF") and the like which is transmitted from the game apparatus 3 via the communication section 75.

Data from the controller 7 such as an operation signal (key data) from the operation section 72, acceleration signals (acceleration data in x-axis, y-axis, and z-axis directions, hereinafter simply referred to as "acceleration data") from the acceleration sensor 701, and the process result data from the imaging information calculation section 74 are outputted to the microcomputer 751. The microcomputer 751 temporarily stores inputted data (the key data, the acceleration data and the process result data) in the memory 752 as the transmission data which is to be transmitted to the communication unit 6. Wireless transmission from the communication section 75 to the communication unit 6 is performed at predetermined time intervals. Since the game processing is generally performed at a cycle of 1/60 sec, the wireless transmission needs to be performed at a cycle of a shorter time period. Specifically, the game processing is performed at a cycle of 16.7 ms (1/60 sec), and a transmission interval of the communication section 75 which is composed of the Bluetooth (registered trademark) is 5 ms, for example. At a timing of performing a wireless transmission to the communication unit 6, the microcomputer 751 outputs, to the wireless module 753, the transmission data stored in the memory 752 as a series of pieces of operation information. The wireless module 753 uses, for example, the Bluetooth (registered trademark) technology so as to modulate the series of pieces of operation information by using a carrier wave having a predetermined frequency and to emit the modulated radio signal from the antenna 754. Thus, the key data from the operation section 72, the acceleration data from the acceleration sensor 701, and the process result data from the imaging information calculation section 74 which are all provided in the controller 7 are modulated by the wireless module 753 into the radio signal, and then transmitted from the controller 7. The communication unit 6 of the game apparatus 3 receives the radio signal, and the game apparatus 3 demodulates or decodes the radio signal to obtain the series of pieces of operation information (the key data, the acceleration data and the process result data). In accordance with the series of pieces of obtained operation information and the game program, the CPU 30 of the game apparatus 3 executes the game processing. In the case where the communication section 75 is configured by using the Bluetooth (registered trademark) technology, the communication section 75 may have a function of receiving transmission data which is wirelessly transmitted from the other devices.

Figure 9:
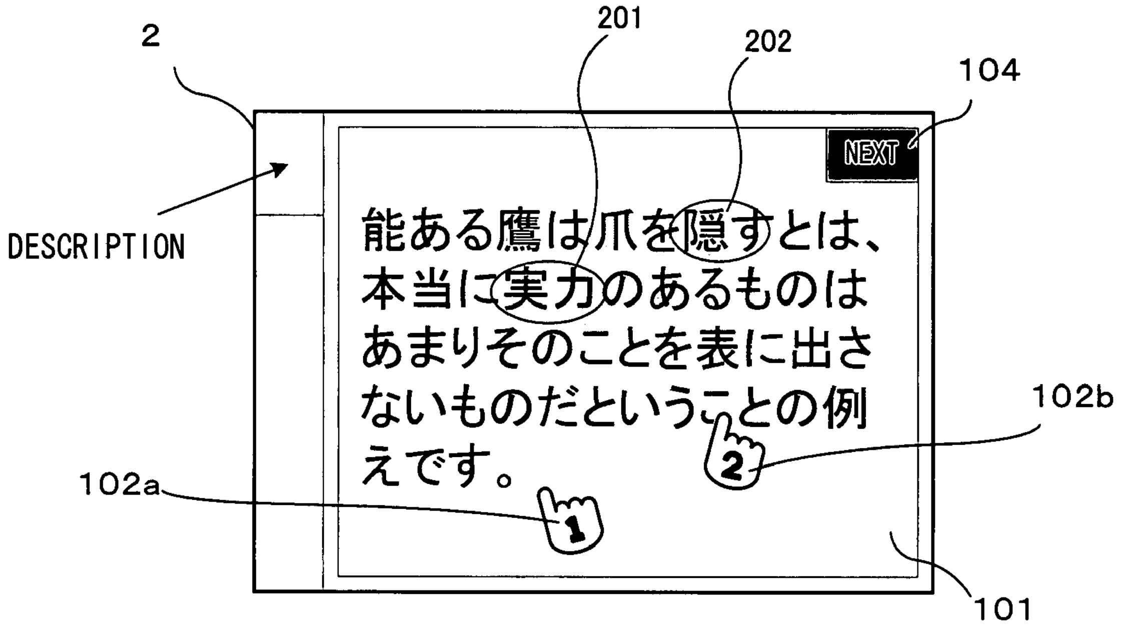
FIG. 9 is a diagram illustrating an exemplary game image according to the present embodiment.
Figure 9:

Next, with reference to FIGS. 9 to 12, an outline of the game processing according to the present embodiment will be described. FIG. 9 shows an exemplary screen of a game according to the present embodiment. In FIG. 9, on the screen of the television 2, a text object 101, a 1-player cursor 102*a* (hereinafter referred to a "1P cursor"), a 2-player cursor 102*b* (hereinafter referred to as a "2P cursor"), and a "next" button 104 are displayed. As the text object 101, a predetermined character string (i.e., a series of characters such as words or sentences. The present embodiment conveniently assumes that the character string is a sentence) is displayed. Note that these objects are disposed in a three-dimensional virtual game space generated by the CPU 10 in the external main memory 12, and an image obtained by picking up the space by a virtual camera is displayed as the screen of the game (on the screen shown in FIG. 9, an image obtained by picking up the text object 101 and the like from the front thereof is displayed). The objects such as the text object 101 and the like are composed of a three-dimensional polygon model formed by a three-dimensional polygon. An entity of the sentence displayed as the text object 101 is a texture mapped onto the polygon model. The screen as shown in FIG. 9 is a screen for describing a correct answer to a question asked in a predetermined quiz game.

A game operation using the controller 7 will be described. When playing a game executed by the game system 1 by using the controller 7, the player holds the controller 7 with one hand. The player holds the controller 7 in a state where the front side of the controller 7 (a side having an incident opening for receiving light picked up by the imaging information calculation section 74) is facing toward the markers 8*a* and 8*b*. In such a state, the player executes the game operation by changing tilt of the controller 7, a position on the screen pointed by the controller 7 (a pointing position) or a distance between the controller 7 and each of the markers 8*a* and 8*b*.

In the present embodiment, it is assumed that two players simultaneously execute the game operation. A first player (hereinafter referred to as a player 1) is capable of moving the 1P cursor 102*a* on the screen by controlling the controller 7*a* in which the front side thereof is facing toward the markers 8*a* and 8*b* (i.e., the screen), as described above. Similarly, a second player (hereinafter referred to as a player 2) is capable of moving the 2P cursor 102*b* on the screen by controlling the controller 7*b*. Note that the 1P cursor 102*a* and the 2P cursor 102*b* are objects indicating pointing positions of the controllers 7*a* and 7*b*, respectively. Although a method of calculating the pointing positions thereof will be described later, each of the pointing positions is represented by coordinates on the screen corresponding to a midpoint of images 8L' and 8R' of the respective markers 8L and 8R included in the operation data transmitted from the controller 7, as described above with reference to FIG. 8. That is, the cursor 102*a* and the cursor 102*b* are displayed at the pointing positions of the controller 7*a* and the controller 7*b*, respectively.

Figure 10:
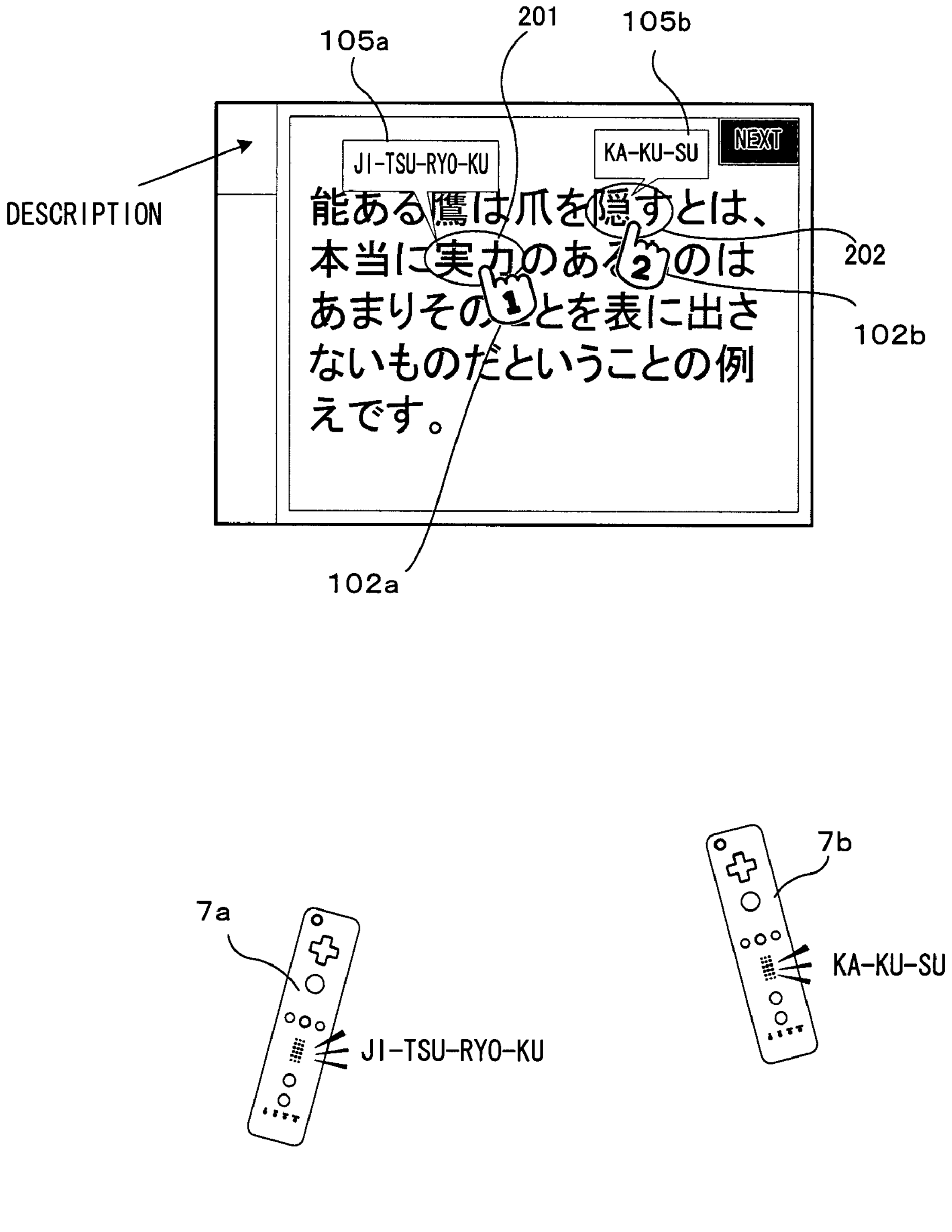
FIG. 10 is a diagram illustrating another exemplary game image according to the present embodiment.

In the game according to the present embodiment, each of the players controls the controller 7 so as to move the cursor, thereby pointing to a predetermined position of a sentence displayed on the screen (i.e., a position at which a word including Kanji (Chinese characters) (hereinafter referred to as a "Kanji word") is displayed). As an example, it is assumed that the first player moves the 1P cursor 102*a* to a position at which a Kanji word 201 (meaning an "ability" or "proficiency") of FIG. 9 is displayed, and the second player moves the 2P cursor 102*b* to a position at which a Kanji word 202 (meaning "to hide") of FIG. 9 is displayed. Then, as shown in FIG. 10, a pronunciation of each of the Kanji words displayed at pointing positions indicated by the cursors of the respective players is outputted by voice from the speaker 706 of the controller 7. Specifically, voice reciting "ji-tsu-ryo-ku" (i.e., the pronunciation of the Kanji word 201) is outputted from the speaker 706 of the controller 7*a*. On the other hand, voice reciting "ka-ku-su" (i.e., the pronunciation of the Kanji word 202) is outputted from the speaker 706 of the controller 7*b*. As such, when each of the plurality of players controls the controller 7 so as to point to the predetermined position on the screen, a pronunciation of each of the Kanji words displayed at the position pointed by the controller 7 is outputted from the speaker 706 of the controller 7 corresponding to each of the cursors. Further, at this time, the pronunciation of the each of Kanji words is also displayed in a balloon. In FIG. 10, characters showing the pronunciations of "ji-tsu-ryo-ku" and "ka-ku-su" are displayed in a balloon object 105*a* and a balloon object 105*b*, respectively.

Figures 11, 12:
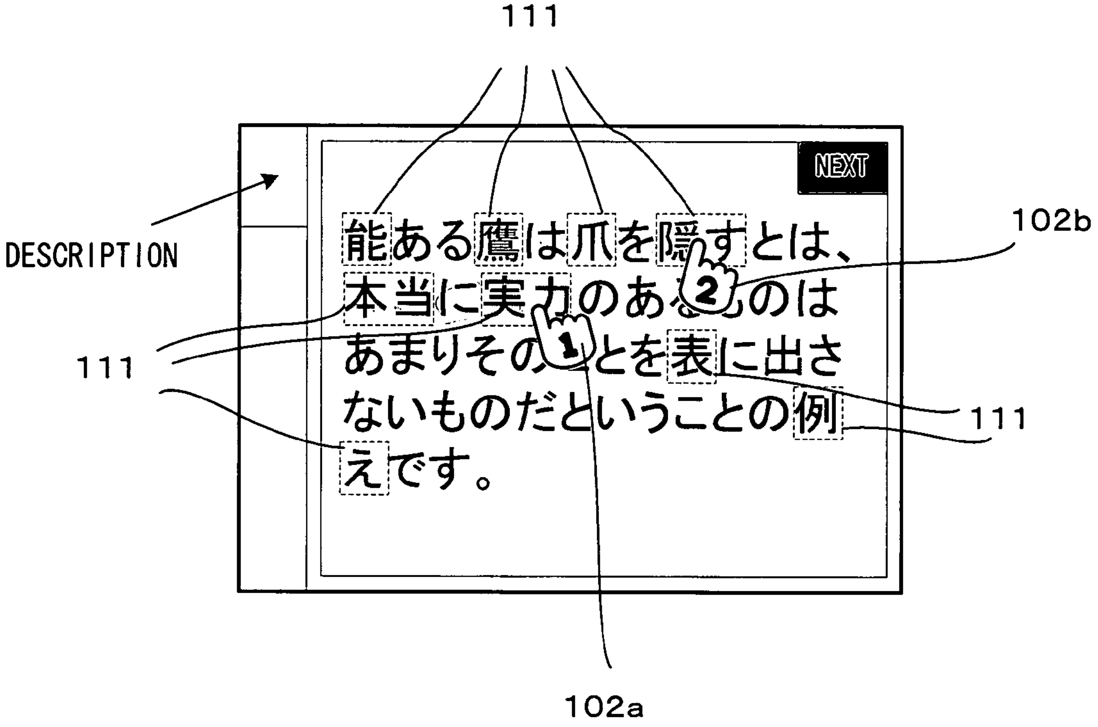
FIG. 11 is a diagram illustrating exemplary tagged text data.
FIG. 12 is a diagram describing hit determination objects.

Next, an outline of a voice output process as described above will be described. Firstly, the sentence displayed as the text object 101 is made of text data. The text data includes information concerning a pronunciation of the aforementioned Kanji word. More specifically, predetermined tags are set for a word in which the pronunciation thereof is to be outputted by voice. FIG. 11 shows exemplary text data including such tags. In FIG. 11, a portion including the word in which the pronunciation thereof is to be outputted is sandwiched between tags <ruby> and </ruby>. Furthermore, in the portion including the word sandwiched between the tags <ruby> and </ruby>, another tag </> is also placed between the word displayed on the screen and Kana (Japanese characters) representing the pronunciation of the word, in order to separate the two from one another. Taking a Kanji word 203 (meaning a "talent" or "ability") which is a first word of a sentence shown in FIG. 11 as an example, the word displayed on the screen is the Kanji word 203, and Kana representing a pronunciation of the Kanji word 203 is a Kana 303 (pronounced as "nou"). In order to separate the Kanji word 203 and the Kana 303 from one another, the tag </> is placed between the Kanji word 203 and the Kana 303. As a result, a portion including all of the elements is represented as "the Kanji word 203 </> the Kana 303". Then, the portion "the Kanji word 203 </> the Kana 303" is further sandwiched between the tags <ruby> and </ruby>. Finally, the portion is represented as "<ruby> the Kanji word 203 </> the Kana 303 </ruby>". As described above, the text data representing the sentence displayed as the text object 101 is formed by representing the word, in which the pronunciation thereof is to be outputted by voice, by being sandwiched between <ruby> and </ruby>. Hereinafter, such text data is referred to as a "tagged text". Also, a word in which a pronunciation thereof is to be outputted is referred to as a "ruby word".

The text object 101 is generated based on the aforementioned tagged text and displayed on the screen. Further, an object for determining whether or not each of the cursors is pointing to a ruby word is also generated and disposed at a display position of the ruby word. Hereinafter, the object is referred to as a "hit determination object". FIG. 12 is a diagram describing a screen in which the hit determination objects 111 are disposed. In FIG. 12, each of the hit determination objects 111 is disposed so as to overlap each of the ruby words. Note that in FIG. 12, each of the hit determination objects 111 is surrounded by a dotted line in order to be easily recognizable. In practice, however, the hit determination objects 111 are transparent objects. Thus, the player cannot visually recognize the hit determination objects 111.

As described above, in the process according to the present embodiment, each of the hit determination objects and each of the ruby words are disposed so as to overlap each other, thereby determining whether or not the cursor of each of the players is in contact with any of the hit determination objects. As a result, when it is determined that the cursor of each of the players is in contact with any of the hit determination objects, voice data is generated by performing voice synthesis based on a pronunciation of a ruby word which the hit determination object overlaps. Thereafter, the voice data is transmitted to the controller 7 corresponding to the cursor, thereby outputting the transmitted voice data from the speaker 706. As such, when a cursor overlaps a display position of a ruby word, a pronunciation of the ruby word is outputted by voice from the controller 7 held by each of the players. Therefore, even when the cursors of the players are pointing to different words, a pronunciation of each of the different words can be outputted from the speaker 706 of the controller 7 of each of the players.

As described above, in the case where a plurality of players control a common screen by using each controller having a speaker, when each of the players points to a ruby word, a pronunciation of the ruby word is outputted by voice from the speaker of each controller. Therefore, even when a plurality of sentences are displayed on the screen, a different word or sentence can be read aloud via the speaker of each controller. In other words, the plurality of players can simultaneously hear words, located at positions desired by the respective players, read aloud. Furthermore, voice is outputted from the controller 7 of each of the players. Therefore, it becomes possible to prevent the voices being produced from being mixed up with each other and then becoming difficult to hear.

Figures 13, 14:
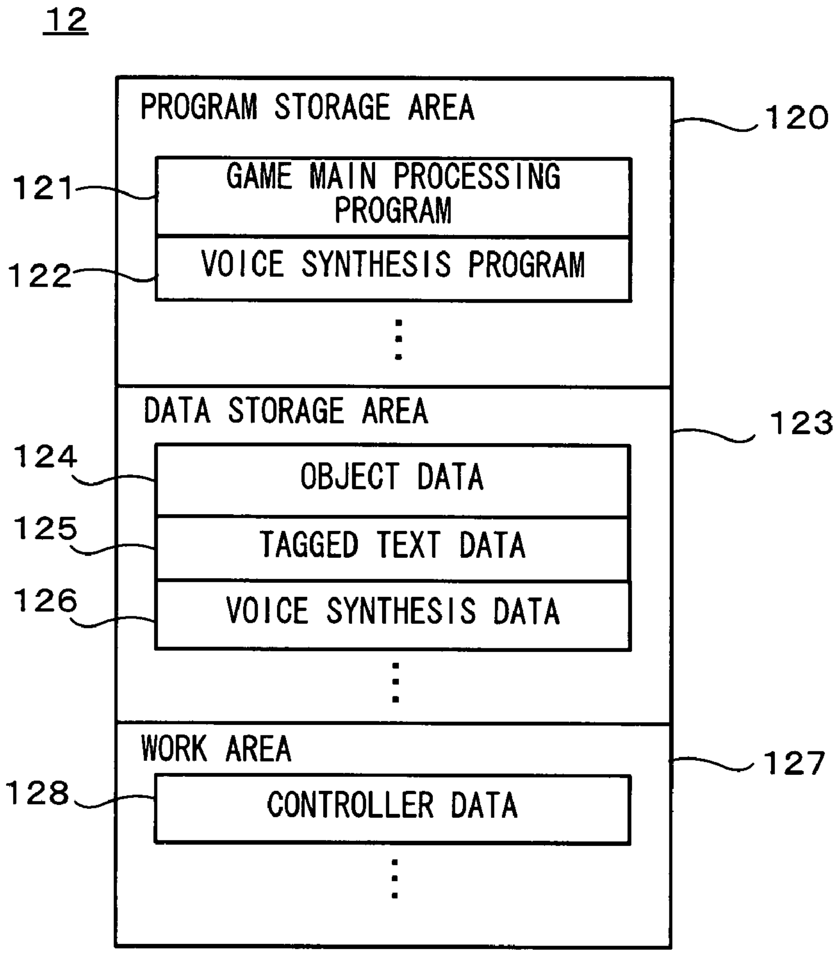
FIG. 13 is a diagram illustrating a memory map of an external main memory 12 of the game apparatus 3.
FIG. 14 is a diagram illustrating an exemplary data structure of controller data 128.

Next, the game processing executed by the game apparatus 3 will be described in detail. Data stored in the external main memory 12 during the game processing will be firstly described. FIG. 13 is a diagram illustrating a memory map of the external main memory 12 included in the game apparatus 3. In FIG. 13, the external main memory 12 includes a program storage area 120, a data storage area 123, and a work area 127. Data in the program storage area 120 and in the data storage area 123 are stored on the optical disc 4. When the game program is executed, the data is transmitted to the external main memory 12 and stored therein.

The program storage area 120 stores the game program executed by the CPU 10. The game program is composed of a game main processing program 121, a voice synthesis program 122 and the like. The game main processing program 121 is a program for realizing processes shown by flowcharts in FIGS. 15 to 21 to be described later. The voice synthesis program 122 is a program for generating voice data by performing the voice synthesis based on the pronunciations shown in the tagged text described above.

The data storage area 123 stores object data 124, tagged text data 125, and voice synthesis data 126. The object data 124 is data from which objects, such as the text object 101 as described with reference to FIG. 9, which are disposed in the virtual game space, are to be made. The tagged text data 125 is, as shown in FIG. 11, data including a sentence displayed on the screen and a pronunciation to be outputted by voice. The voice synthesis data 126 is data used when generating the voice data to be transmitted to the controller 7 in the voice synthesis program 122. In the case of Japanese, for example, data representing voice reciting “a”, “i”, “ka”, “ki”, or the like is stored.

The work area 127 is an area for storing temporary data, such as controller data 128 or the like, which is used during the game processing. FIG. 14 is a diagram illustrating an exemplary data structure of the controller data 128. The controller data 128 is provided for each of the controllers connected to the game apparatus 3. The controller data 128 is comprised of a controller ID 1281, pointing coordinates 1282, a transmitted flag 1283 and voice data 1284.

The controller ID 1281 is an ID for distinguishing the controllers from each other. When the controller 7 is connected to the game apparatus 3, a predetermined number is assigned to the controller 7. In the present embodiment, an ID is assigned to the controller 7 sequentially from 1, 2, 3 . . . in the order of being connected to the game apparatus 3. For example, in the case where two players play the game, the controller ID 1281 of the player 1 is “1”, and the controller ID 1281 of the player 2 is “2”.

The pointing coordinates 1282 are data calculated based on the operation data transmitted from the controller 7. The pointing coordinates 1282 are coordinates, on the screen, pointed by the controller 7.

The transmitted flag 1283 is a flag for indicating, when a ruby word is pointed to, whether or not voice data representing a pronunciation of the ruby word has been transmitted to the controller 7. When the transmitted flag 128 is “ON”, the voice data has been transmitted. On the other hand, when the transmitted flag 128 is “OFF”, the voice data has not yet been transmitted.

The voice data 1284 is voice data generated by the voice synthesis program 122.

Next, with reference to FIGS. 15 to 21, the game processing executed by the game apparatus 3 will be described. When the game apparatus 3 is powered on, the CPU 10 of the game apparatus 3 executes a boot program stored in the ROM/RTC 13 so as to initialize each unit such as the external main memory 12. The game program stored on the optical disc 4 is loaded to the external main memory 12 and the CPU 10 starts to execute the game program. At this time, the controller data 128, to which the controller ID 1281 is assigned, as appropriate, in accordance with the number of the controllers 7 being connected to the game apparatus 3, is generated in the work area 127. Note that the present embodiment describes only the game processing according to example embodiments of the present invention which have been described with reference to FIGS. 9 to 12, and the description of other game processing will be omitted. A processing loop of steps S1 to S9 as shown in FIG. 15 is repeatedly executed for each frame (every 1/60 second).

Figure 15:
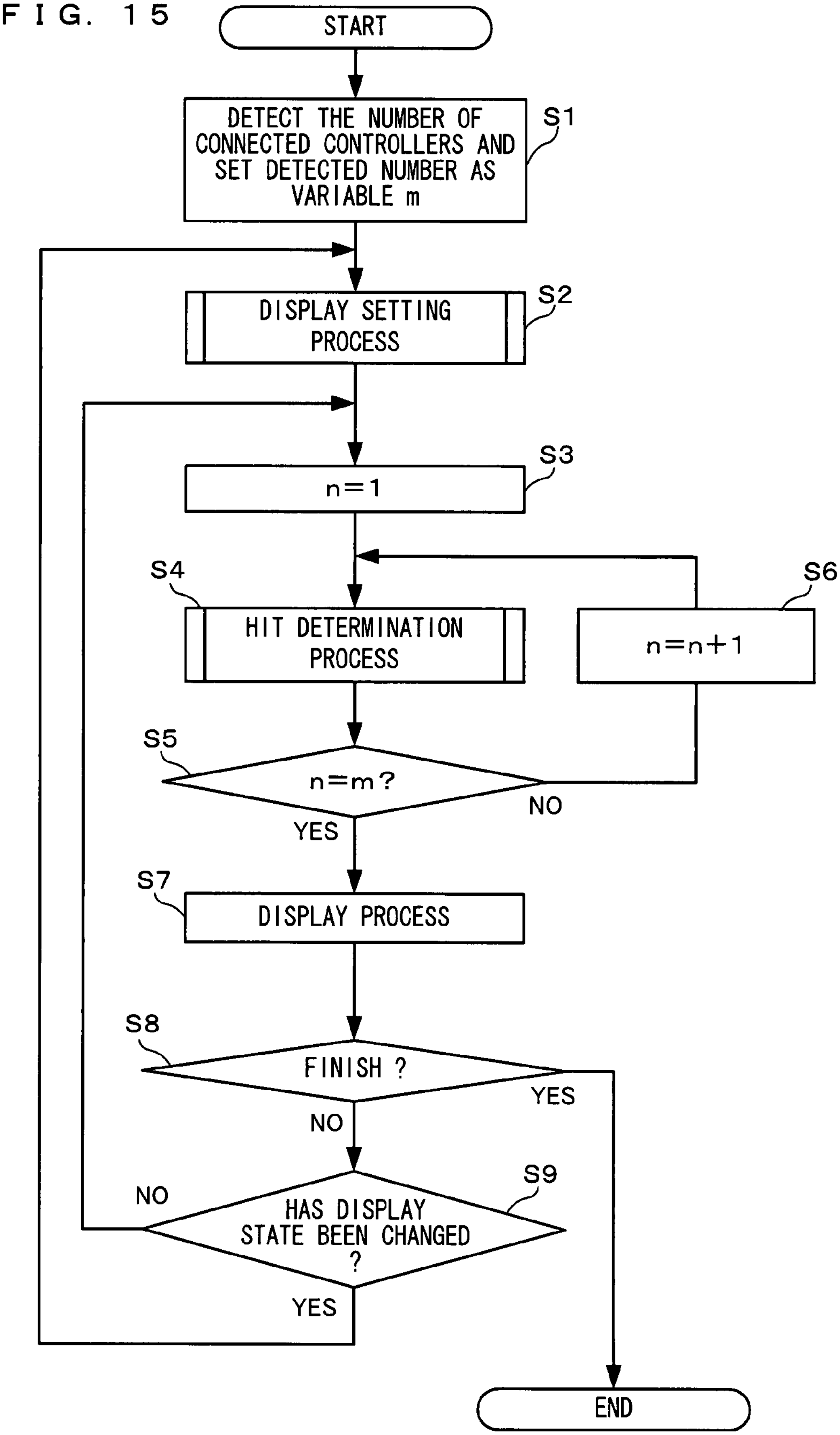
FIG. 15 is a flowchart illustrating a game processing according to a first example embodiment of the present invention.

In FIG. 15, the CPU 10 firstly detects the number of the controllers 7 connected to the game apparatus 3. Then, the detected number is set as a variable “m” (step S1).

Next, the CPU 10 executes a display setting process (step S2). In the display setting process, the text object 101 displayed on the screen is generated based on the tagged text data 125 such that the hit determination object 111 is disposed thereon.

Figure 16:
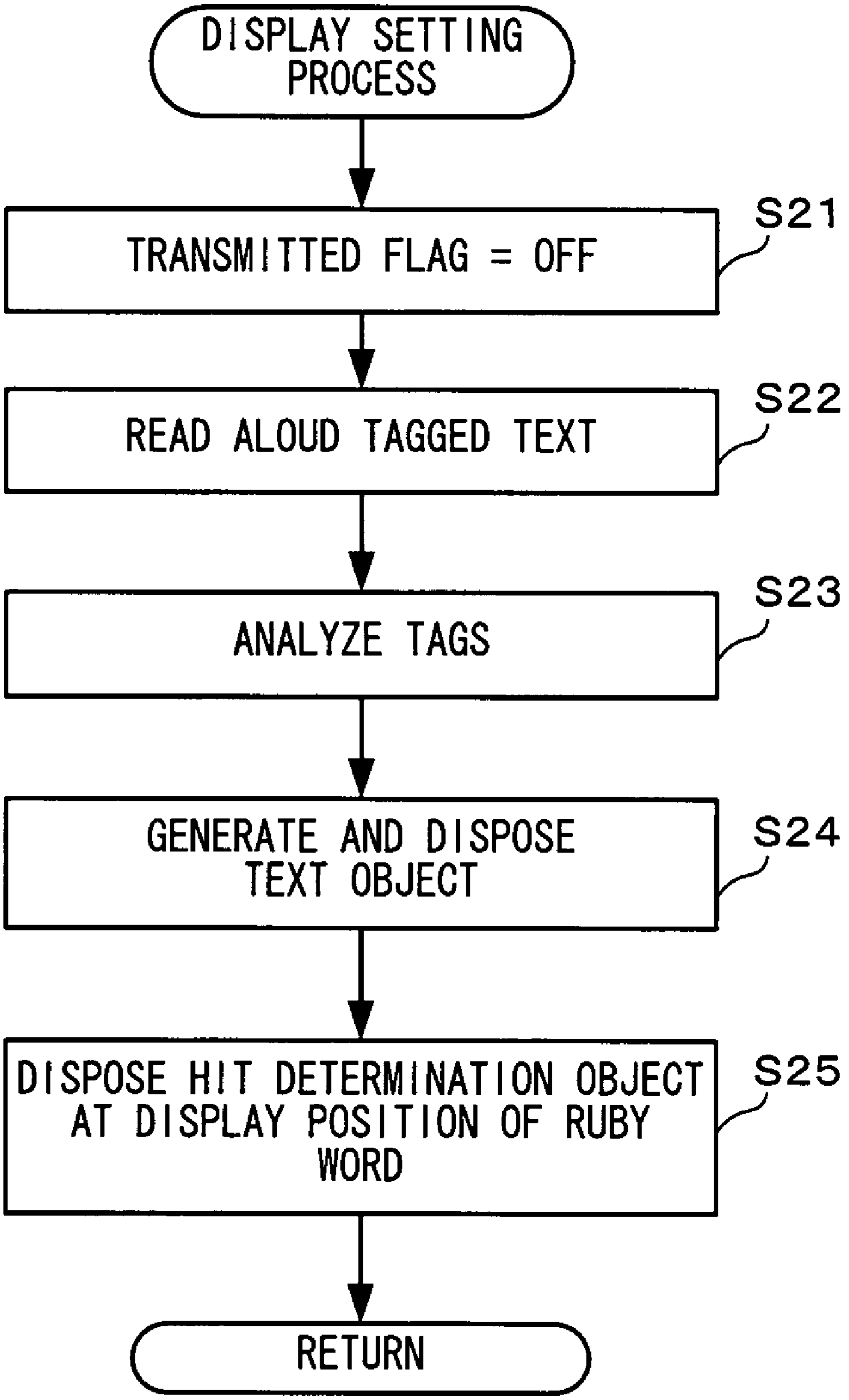
FIG. 16 is a flowchart illustrating a detail of a display setting process shown in step S2 of FIG. 15.

FIG. 16 is a flowchart illustrating a detail of the display setting process shown in step S2 mentioned above. In FIG. 16, the CPU 10 firstly sets the transmitted flag 1283 “OFF”, thereby initializing the transmitted flag 1283 (step S21). Then, the CPU 10 reads the tagged text data 125 from the external main memory 12 (step S22).

Next, the CPU 10 analyzes the tags included in the tagged text data 125 having been read, thereby detecting the ruby words (each of which being sandwiched between <ruby> and </ruby>) (step S23). Then, the detected ruby words are stored in the work area as words included in a ruby word list. FIG. 17 shows an exemplary ruby word list. In FIG. 17, a ruby number 201 is assigned to each of the detected ruby words, and a pronunciation of each of the ruby words (a portion sandwiched between </> and </ruby>) is stored as a pronunciation 202.

Then, the CPU 10 generates the text object 101 and the like, and disposes the generated objects in the three-dimensional virtual game space (step S24). For example, the CPU 10 executes the following processes. Firstly, the CPU 10 reads the object data 124 from the external main memory 12, thereby modeling the read data (as a result, in the present embodiment, a quadrangular panel type object is generated). Thereafter, based on the tagged text data 125, the CPU 10 generates a texture (image) such that a predetermined sentence is displayed. At this time, positional information (coordinates and the like), indicating a position at which each of the ruby words is displayed on the texture, is stored in the work area 127. Thereafter, the CPU 10 maps the texture onto the modeled object, thereby generating the text object 101 as shown in FIG. 9 and the like. Based on the positional information stored in the work area 127, the CPU 10 also generates a table indicating a position at which each of the ruby words mapped onto the text object 101 is displayed, and stores the table in the work area 127. Hereinafter, this data is referred to as a "ruby word position table". FIG. 18 shows an exemplary structure of the ruby word position table. In FIG. 18, coordinates data 203 indicating positions on the text object 101 (in the present embodiment, the positions are represented using a world coordinate system. As a matter of course, the positions may also be represented using a local coordinate system) and a ruby number 204 associated with each of the positions are stored. The ruby number 204 corresponds to the ruby number 201 included in the ruby word list generated in step S23 mentioned above (see FIG. 17). Furthermore, in the case where one ruby word is displayed over two lines, a position at which the ruby word is displayed is stored for each of the lines (e.g., a ruby word having "8" as the ruby number 204). Then, the CPU 10 disposes the text object 101 in the virtual game space. Thereafter, the CPU 10 generates other objects such as the "next" button 12 so as to be disposed in the virtual game space, as appropriate.

Next, the CPU 10 disposes each of the hit determination objects 111 at the position at which each of the ruby words is displayed (step S25). Such an arrangement process is executed as follows, for example. Firstly, based on the ruby word position table stored in the work area 127, the CPU 10 calculates a size of an area, on the text object 101, which is occupied by each of the ruby words. Then, the CPU 10 generates an object having the size of the area occupied by each of the ruby words. Next, the CPU 10 sets a transparent color for the object, thereby generating the hit determination object 111. Thereafter, the CPU 10 disposes each of the hit determination objects 111 at the position, on the text object 101, at which each of the ruby words is displayed. Thus, the hit determination object 111 is disposed at the position at which each of the ruby words is displayed. At this time, the CPU 10 generates a table showing the hit determination object 111 associated with each of the ruby words, and stores the table in the work area 127. Hereinafter, the table is referred to as a "hit determination table". FIG. 19 shows an exemplary hit determination table. In the hit determination table shown in FIG. 19, an object ID 205 corresponding to a ruby number 206 is assigned to each of the hit determination objects 111. Further, the ruby number 206 corresponds the ruby number 201 included in the ruby word list generated in step S23 mentioned above. As such, the display setting process will be finished.

Note that the aforementioned method of disposing the hit determination object 111 is merely an example. The present invention is not limited thereto. Only if the hit determination object 111 can be disposed at a position at each of the ruby words is displayed, any processing method may be used.

Referring back to FIG. 15, the display setting process in step S2 is finished, the CPU 10 sets "1" as a variable "n" (step S3). The variable "n" is used for distinguishing the controllers 7 from each other, for which a hit determination process is to be executed subsequently.

Next, the CPU 10 executes the hit determination process (step S4). In the hit determination process, whether or not each of the controllers is pointing to any of the ruby words is determined. When it is determined that each of the controllers is pointing to any of the ruby words, voice data representing a pronunciation of the pointed ruby word is transmitted to the corresponding controller 7.

Figure 20:
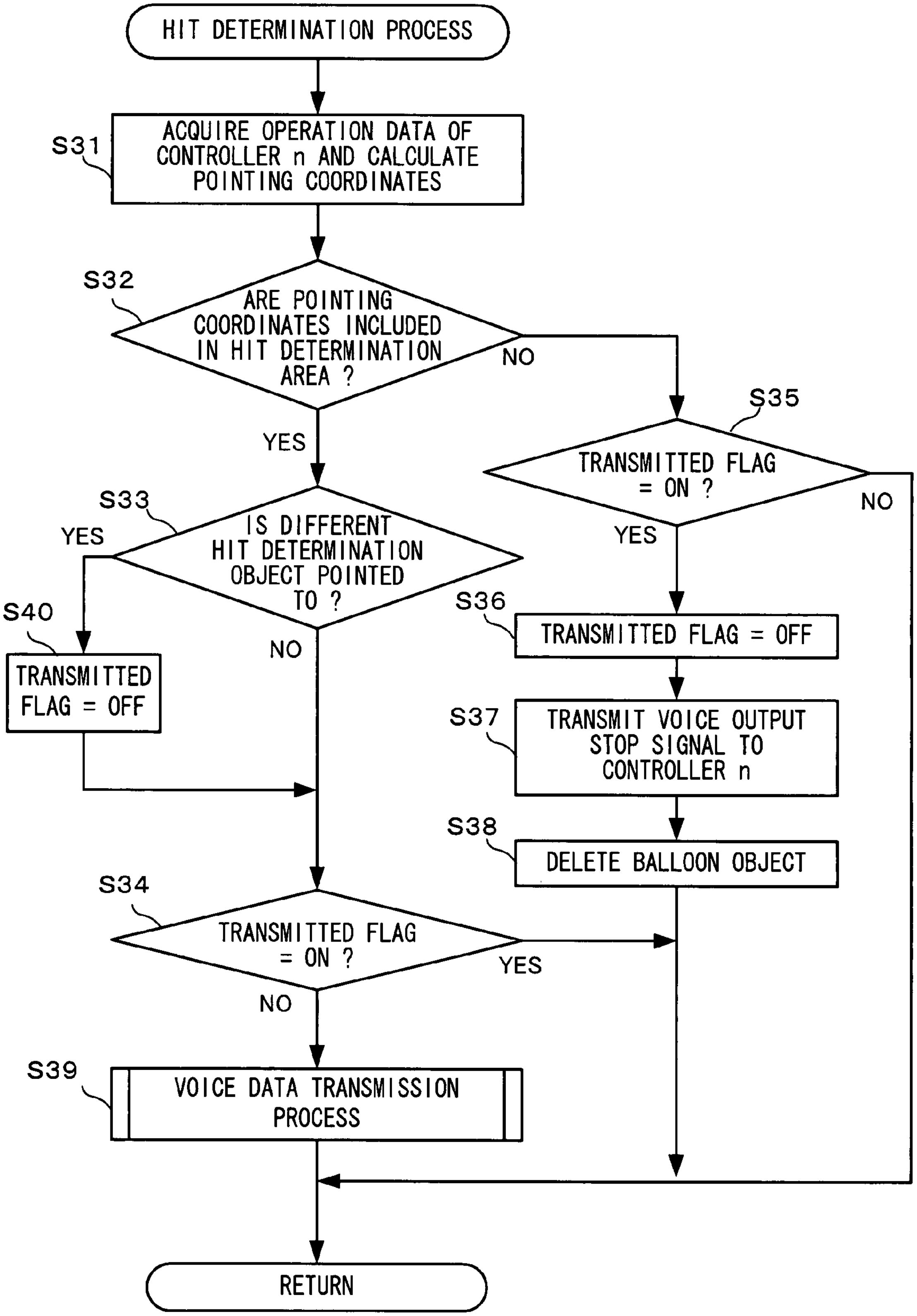
FIG. 20 is a flowchart illustrating a detail of a hit determination process shown in step S4 of FIG. 15.

FIG. 20 is a flowchart illustrating a detail of the hit determination process shown in step S4 mentioned above. In FIG. 20, the CPU 10 acquires the operation data transmitted from the controller 7 having "n" as the controller ID (hereinafter simply referred to as a "controller n". In the case where "n" is "1", for example, a controller having "1" as the controller ID (i.e., the controller 7$a$ controlled by the player 1) is indicated. Thereafter, based on the operation data, a pointing position (i.e., pointing coordinates) of the controller n is calculated (step S31). Note that any method can be used for calculating the pointing coordinates. The following method of calculating the pointing coordinates may be used, for example.

Hereinafter, an exemplary method of calculating the pointing coordinates will be described. The operation data transmitted from the controller n includes data representing the marker coordinates. The data represents the marker coordinates indicating two positions corresponding to the markers 8L and 8R (see FIG. 8). Therefore, the CPU 10 firstly calculates a midpoint between the two positions represented by the marker coordinates. A position of the midpoint is represented using the x-y coordinate system for indicating positions on a plane corresponding to a picked up image. Next, the CPU 10 converts the coordinates indicating the position of the midpoint into coordinates represented using another coordinate system (a x'-y' coordinate system) for indicating positions on the screen of the television 2. This conversion can be performed by using a function for converting the coordinates indicating the midpoint calculated based on a picked up image into coordinates, on the screen, corresponding to an actual pointing position of the controller n obtained at the time of imaging the picked up image. In this case, the pointing position of the controller n moves in a direction opposite to a direction in which the position, indicated by the midpoint between the two positions represented by the marker coordinates, moves on the picked up image. Thus, the conversion is performed such that the two positions are inverted vertically and horizontally. A value represented by x'-y' coordinates calculated as described above indicates the pointing coordinates of the controller n.

Next, the CPU 10 accesses the controller data 128, and stores the calculated pointing coordinates as the pointing coordinates 1282 of the controller n. Furthermore, the CPU 10 disposes a cursor object (corresponding to the cursors 102$a$ or 102$b$) used for the controller n at a position indicated by the pointing coordinates 1282.

Then, the CPU 10 determines whether or not the position on the screen indicated by the pointing coordinates 1282 is included in an area in which any of the hit determination objects 111 is displayed (note that since the hit determination objects 111 are transparent, the player cannot visually recognize the objects) (step S32). That is to say, whether or not the player is pointing to any of the ruby words is determined. For example, this determination is made based on whether or not the pointing coordinates 1282 are included in any of areas on the screen, indicated by values obtained by converting coordinates indicating positions of the hit determination objects 111 into coordinates on the screen. That is, in a two-dimensional coordinate system, whether or not the pointing coordinates 1282 are included in any of the hit determination objects 111 is determined. Taking the above-described screen shown in FIG. 10 as an example, pointing coordinates of the player 1 are included in one of the hit determination objects 111 which overlaps a display area of the Kanji word 201. Also, pointing coordinates of the player 2 are included in another one of the hit determination objects 111 which overlaps a display area of the Kanji word 202.

As a result, when it is determined that the pointing position of the controller n is included in a display area of any of the hit determination objects 111 (YES in step S32), the CPU 10 further determines whether or not the hit determination object 111 pointed to in a current processing loop is different from one that was pointed to in an immediately preceding processing loop (a processing loop executed in a frame immediately preceding a current frame) (step S33). Thus, even in the case where ruby words having different pronunciations (the plurality of hit determination objects 111) are displayed adjacent to each other, for example, it can be determined whether or not the pronunciations of the ruby words pointed to in the current frame and the frame immediately preceding the current frame are different from each other. Specifically, whether a different ruby word is subsequently pointed to or not is determined even while maintaining a state in which the pointing position of the controller n is included in any of the hit determination objects 111, since any of the hit determination objects 111 may be displayed adjacent to each other and may overlap two or more different ruby words. As a result, when it is determined that the ruby word (the hit determination object 111) pointed to in the current frame is the same as one that was pointed to in the frame immediately preceding the current frame (No is step S33), the CPU 10 accesses the controller data 128, thereby determining whether or not the transmitted flag 1283 of the controller n is "ON" (step S34). For example, in the case of n=1, the pointing coordinates 1282 obtained based on the operation data transmitted from the controller 7*a* (the controller ID thereof is "1"), i.e., the pointing coordinates 1282 of the player 1 are included in a display area of any of the hit determination objects 111, the CPU 10 searches the controller data 128 for data having "1" as the controller ID. Thereafter, the CPU 10 determines whether or not the transmitted flag 1283 of the searched data is "ON".

As a result in step S34, it is determined that the transmitted flag 1283 of the controller n is "ON" (YES in step S34), the CPU 10 finishes the hit determination process. On the other hand, when it is determined that the transmitted flag 1283 of the controller n is "OFF" (NO in step S34), the voice data is not yet generated nor transmitted. Therefore, the CPU 10 subsequently executes a voice data transmission process for generating the voice data representing a pronunciation to be transmitted to the controller n (step S39).

On the other hand, as a result of step S33, when it is determined that the ruby word (the hit determination object 111) pointed to in the current frame is different from one that was pointed to in the frame immediately preceding the current frame (YES in step 33), the CPU 10 sets the transmitted flag "OFF" (step S40) and advances the process to step S34. As a result, it is determined "NO" in step S34 and the voice data transmission process is to be executed for a pronunciation of a newly pointed ruby word.

Figure 21:
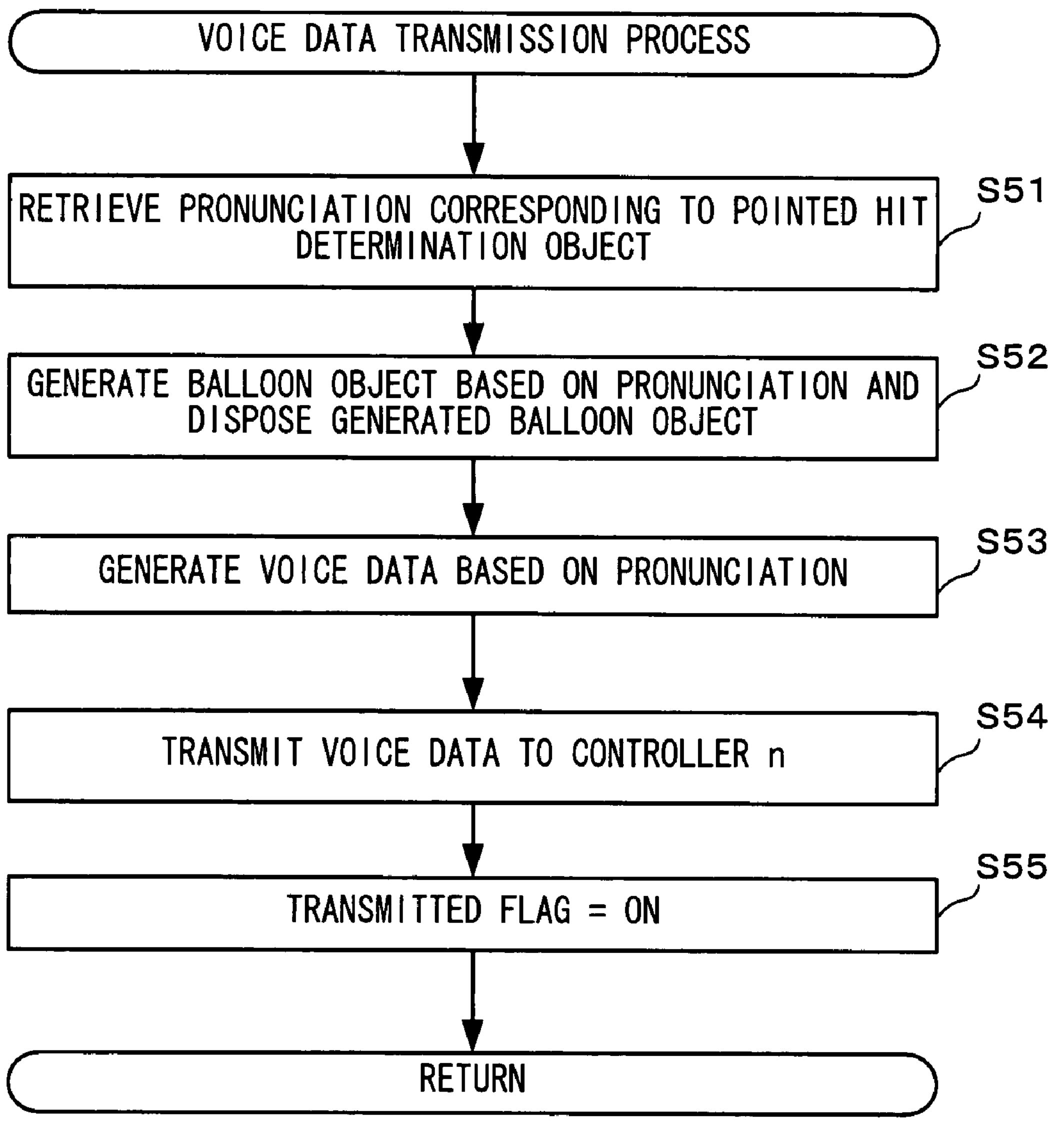
FIG. 21 is a flowchart illustrating a detail of a voice data transmission process shown in step S34 of FIG. 20.

FIG. 21 is a flowchart illustrating a detail of the voice data transmission process shown in step S39 mentioned above. In FIG. 21, a pronunciation corresponding to the hit determination object 111 pointed by the controller n is firstly retrieved from the hit determination table (see FIG. 19) and the like (step S51). Taking the process executed for the player 1 as an example, the CPU 10 firstly detects the object ID 205 of the hit determination object 111 existing at the pointing position of the controller 7*a*. Then, by reading the hit determination table, the ruby number 206 is retrieved based on the object ID 205. Furthermore, by reading the ruby word list (see FIG. 17) stored in the work area in step S23, the pronunciation 202 is retrieved based on the ruby number 206. In the case of the aforementioned screen shown in FIG. 10, for example, as the process to be executed for the controller of the player 1 (i.e., the process to be executed in the case of n=1), the CPU 10 retrieves the pronunciation of "ji-tsu-ryo-ku".

Next, the CPU 10 generates the balloon object 105 (see FIG. 10) based on the retrieved pronunciation 202 (step S52). Then, the CPU 10 disposes the balloon object 105 in the vicinity of the hit determination object 111. At this time, the balloon object 105 is associated with the controller ID 1281 of the controller n. Note that in the case where the balloon objects 105 overlap each other, a newly disposed object is displayed in front of a previously disposed object. In this case, in order to allow a ruby word pointed to by the controller n to be more easily recognizable, only a background color of a display area of the ruby word may be changed.

Then, based on the retrieved pronunciation 202, the CPU 10 generates voice data by means of a predetermined voice synthesizing technique (step S53). For example, concatenative synthesis, which is a technique for synthesizing voice by concatenating segments of recorded voice with one another, is used as the predetermined voice synthesizing technique. In this case, "a segment of voice recorded for each character" is previously stored as the voice synthesis data 126. Specifically, data in which a voice reciting "a", "i", "ka", "ki" or the like is recorded corresponds to "the segment of voice recorded for each character". Next, the CPU 10 stores the generated voice data in the controller data 128 as the voice data 1284 of the controller n. Note that the aforementioned voice synthesizing technique is merely an example. The present invention is not limited thereto. Any voice processing technique may be used only if the voice data representing voice reciting pronunciations of words can be generated. For example, instead of "the segment of voice recorded for each character", data representing a voice recorded for each word may be used. In the case of outputting a pronunciation of a word, the data corresponding to the word may be read, thereby outputting the data. Particularly, such a voice output technique is more suitable for English or the like.

Next, the CPU 10 transmits the voice data 1284 to the controller n (step S54). As a result, as shown in FIG. 10, for example, the CPU 10 transmits a piece of voice data representing the pronunciation of "ji-tsu-ryo-ku" to the controller 7*a* of the player 1 (i.e., in the case of n=1). Also, the CPU 10 transmits another piece of voice data representing the pronunciation of "ka-ku-su" to the controller 7*b* of the player 2 (i.e., in the case of n=2).

Finally, the CPU sets the transmitted flag 1283 of the controller n "ON" (step S55). As such, the voice data transmission process will be finished.

Referring back to FIG. 20, a process to be executed when it is determined, in step S32, that the pointing coordinates 1282 are not included in the display area of any of the hit determination objects 111 (NO is step S32) will be described. As a result of step S32, when it is determined that the pointing coordinates 1282 of the controller n are not included in the display area of any of the hit determination objects 111, the CPU 10 reads the controller data 128, thereby determining whether or not the transmitted flag 1283 of the controller n is set "ON" (step S35).

As a result, when it is determined that the transmitted flag 1283 is "OFF" (NO in step S35), the CPU 10 finishes the hit determination process. On the other hand, when it is determined that the transmitted flag 1283 is "ON" (YES in step S35), the CPU 10 sets the transmitted flag 1283 "OFF" (step S36).

Next, the CPU 10 transmits a voice output stop signal to the controller n (step S37). In the controller n which has received the voice output stop signal, a process for stopping voice outputted from the speaker 706 is executed. Thus, even while a long word (a word containing a great number of characters) is being outputted by voice, the voice output can be stopped when the cursor is removed from the word.

Furthermore, the balloon object 105 corresponding to the controller n is also deleted (step S38). That is, when the cursor is removed from a ruby word, the balloon object 105 corresponding to the ruby word is accordingly removed. As such, the hit determination process will be finished.

Referring back to FIG. 15, subsequent to the hit determination process in step S4, the CPU 10 determines whether or not the variable "n" equals the variable "m" (step S5). This determines whether or not the hit determination process has been executed for all of the controllers 7 connected to the game apparatus 3. As a result, when it is determined that n=m is not satisfied (NO is step S5), the CPU 10 adds "1" to "n" (step S6) and repeats the hit determination process in step S4. By repeating this process, the hit determination process is to be executed for all of the controllers 7 connected to the game apparatus. As a result, whether or not each controller 7 is pointing to a ruby word is determined, voice data is generated based on the determination result, and the generated voice data is transmitted to each controller 7.

On the other hand, when it is determined that n=m is satisfied (YES in step S5), the hit determination process has been executed for all of the controllers 7. Therefore, the CPU 10 executes a display process (step S7). Specifically, the CPU 10 executes a process for displaying, on the screen of the television 2, an image obtained by picking up the three-dimensional virtual game space by the virtual camera as the game image.

Next, the CPU 10 determines whether or not the game is to be finished (step S8). When it is determined that the game is to be finished (YES in step S8), the game processing is to be finished. On the other hand, when it is determined that the game is not yet to be finished (NO is step S8), the CPU 10 determines whether or not a display state of the screen has been changed based on the operation data (of any controller 7) acquired in step S31 (step S9). For example, there may be a case where a content of a sentence to be displayed is completely changed as a result of performing an operation of pushing the "next" button 104 (see FIG. 9) displayed on the screen. There may be another case where a display position of a sentence is changed (though a content thereof remains the same) as a result of performing a scroll operation.

As a result of step S9, when it is determined that the display state has not been changed (NO in step S9), the game processing returns to step S3 to repeat the aforementioned process. On the other hand, when it is determined that the display state has been changed (YES in step S9), the game processing returns to step S2 to repeat the aforementioned process. As a result, the display setting process is to be executed again. Thus, even when a display position of a ruby word has been changed due to scrolling, scaling or deformation of the screen, a display position of the hit determination object also can be changed in accordance with the display position of the ruby word.

As described above, according to the present embodiment, in the case where a plurality of players control a common screen by using each controller 7 having a speaker, when each of the plurality of players points to a predetermined word (ruby word) displayed on the screen, a pronunciation of the predetermined word is outputted from the speaker of each controller 7. Thus, even when a plurality of sentences are displayed on the screen, a different word or sentence can be read aloud via the speaker of each controller. In other words, the plurality of players can simultaneously hear words, located at positions desired by the respective players, read aloud. Furthermore, voice is outputted from the controller 7 of each of the players. Therefore, it becomes possible to prevent the voices being produced from being mixed up with each other and then becoming difficult to hear.

Furthermore, in the case where the aforementioned balloon objects were displayed overlapping each other, for example, it would be difficult for either one of the players to visually recognize a pronunciation of a Kanji word to which the player is pointing. However, even in such a case, the pronunciation is outputted by voice from the controller 7 held by each of the players, thereby making it possible to allow each of the players to recognize the pronunciation of the Kanji word to which the player is pointing.

Note that in the case of generating the voice data, either one of a male or female voice may be used depending on the gender of a player. For example, at the time of starting the game, each player is prompted to input his or her gender as player information, and the player information associated with the controller ID of the controller 7 is previously stored in the external main memory 12 or the like. Based on the inputted gender, for example, a piece of voice data representing the female voice may be generated so as to be transmitted to the controller 7 held by a male player, and another piece of voice data representing the male voice may be generated so as to be transmitted to the controller 7 held by a female player. Alternatively, characters representing male and female figures are previously stored on the optical disc 4 or in the flash memory 17 of the game apparatus 3 as a potion of game data. At the time of starting the game, each player may be prompted to select either one of the characters so as to be associated with the controller ID of each controller 7. Thereafter, similarly to the case mentioned above, the voice data representing the male or female voice may be generated depending on the gender of each player so as to be transmitted to each controller 7.

Furthermore, although the above embodiment illustrates an example where the voice data is generated by performing the voice synthesis, the present invention is not limited thereto. The voice data in which voice reciting words is recorded may be used. For example, data in which a human voice reciting the words is recorded (e.g., a WAVE file or the like) is previously stored on the optical disc 4 as a portion of the game data. At the time of starting the game, the data is loaded to the external main memory 12 and stored therein. Then, in step S53 shown in FIG. 22, instead of generating the voice data by performing the voice synthesis, the data in which the human voice is recorded may be read as appropriate so as to be outputted to the controller 7. Thus, the voice can be outputted more smoothly as compared with the voice generated by performing the voice synthesis, thereby making it possible to allow the players to easily hear the pronunciations.

Furthermore, it is assumed that the game is a quiz game, and multiple choices for an answer to each question are displayed on the screen, for example. In such a case, when the player moves the cursor to point to a display position of each of the choices, the contents of the pointed choice may be outputted by voice. Also, when the player performs a predetermined operation, e.g., the player pushes the operation button 72*d*, one of the choices corresponding to the operation button 72*d* may be selected as an answer of the player.

Still furthermore, a translation of a text displayed in foreign languages may be outputted, by voice, from the controller 7 held by each player, for example. As an example, a text displayed in English is outputted by voice in Japanese. Furthermore, as a virtual language used in a virtual game world, a character (font) that the player cannot read is displayed. When the player moves the cursor to point to a display area of the character, the contents displayed on the area may be outputted, by voice, from the controller 7 of each player. For example, a player moves the cursor to point to a signboard on which the virtual language used in the virtual game world is displayed, a voice reciting "a weapon store" may be outputted from the controller 7 of the player pointing to the signboard. Also, other than the signboard, a determination area corresponding to a predetermined object is set, and when the determination area is pointed to, a voice corresponding to the object can be outputted. Particularly, in the case where a plurality of players perform operations, the players can individually hear voices reciting the pronunciations, descriptions or the like of desired objects.

Alternatively, irrespective of whether or not the character is displayed, when the predetermined area on the game screen is pointed to, information on a hint how to proceed with the game may be outputted by voice from the controller 7 pointing to the area. The more hints a player finds, the more advantageously the player proceeds with the game. Thus, particularly in a game in which a great number of players compete with each other, it becomes possible to increase an interest in the game.

Second Embodiment

Figure 22:
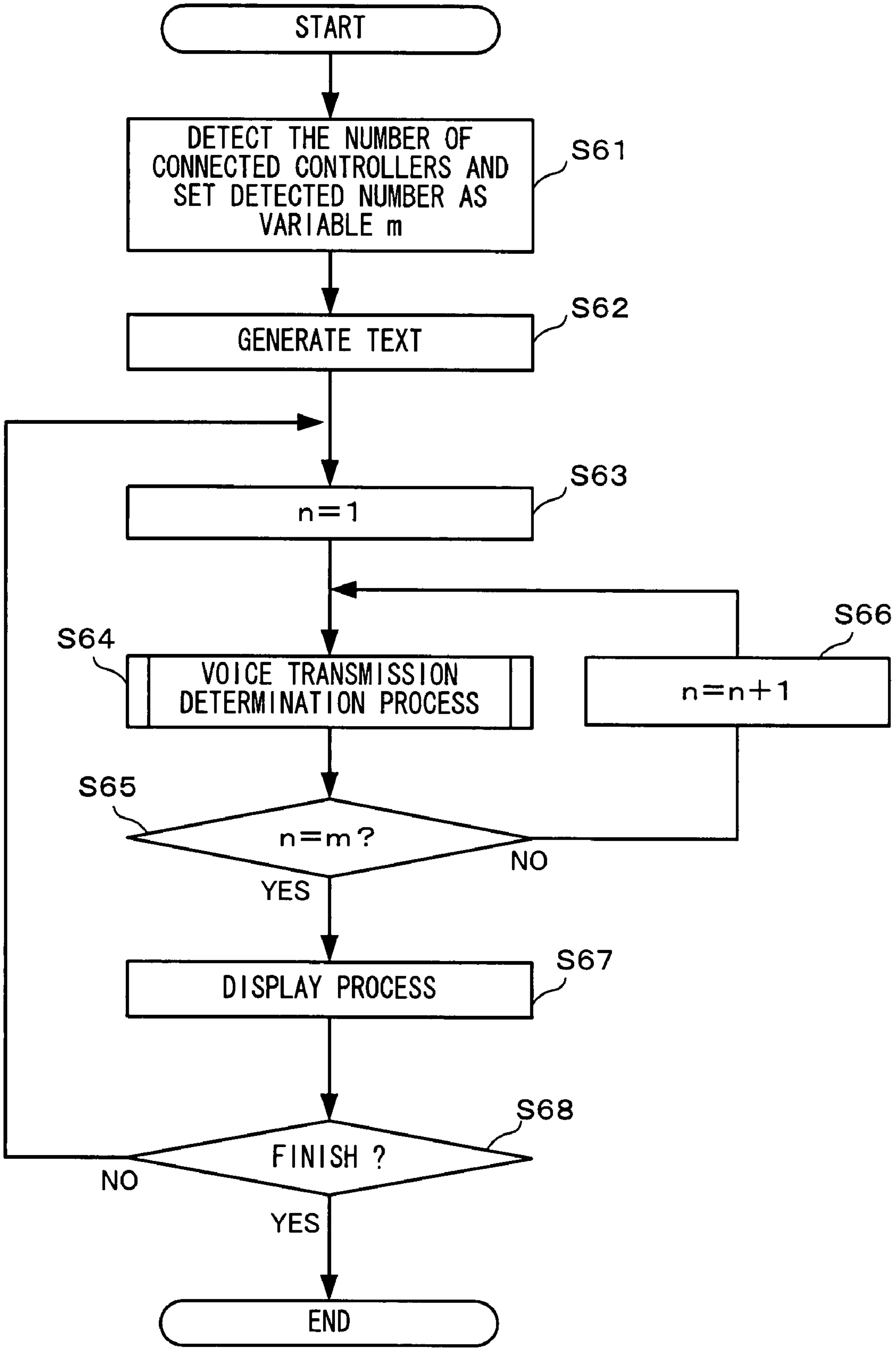
FIG. 22 is a flowchart illustrating the game processing according to a second example embodiment of the present invention.
Figure 23:
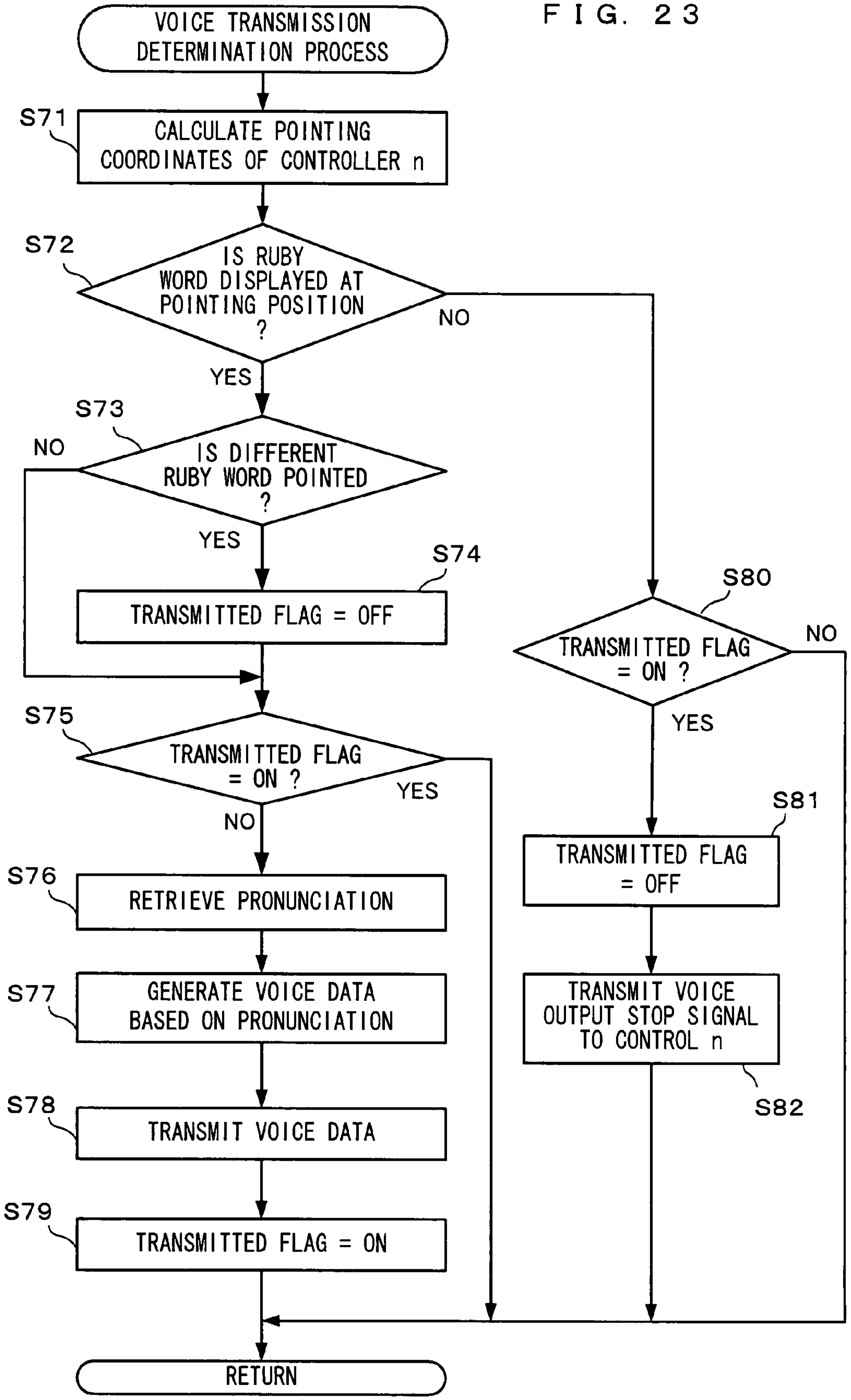
FIG. 23 is a flowchart illustrating a detail of a voice transmission determination process shown in step S64 of FIG. 22.

With reference to FIGS. 22 to 23, a second example embodiment of the present invention will be described. In the first embodiment above, the game processing is executed in the three-dimensional virtual game space. In contrast, in the second embodiment, the game processing is executed in a game space using a two-dimensional coordinate system. Since a game apparatus according to the present embodiment is the same as that according to the first embodiment described above, the game apparatus will be denoted by the same reference numeral and any detailed description thereof will be omitted. Also, in the present embodiment, the data stored in the external main memory 12 has the same configuration as that of the first embodiment. Therefore, any detailed description thereof will be omitted. Note that in the present embodiment, instead of the data representing the three-dimensional space (e.g., the polygon data), data representing the two-dimensional space is stored in the external main memory 12.

Next, an outline of the game processing according to the present embodiment will be described. In the second embodiment, based on the tagged text data 125 as described in the first embodiment, a text is displayed on the screen. If any of the ruby words is displayed at a position indicated by the pointing coordinates, a pronunciation of the ruby word is retrieved from the tagged text data 125. Then, based on the retrieved pronunciation, voice data is generated by performing the voice synthesis. Similarly to the first embodiment, the voice data is transmitted to the controller 7 pointing to the position so as to be outputted from the speaker 706 of the controller 7 of each of the players.

Hereinafter, with reference to FIGS. 22 to 23, the game processing according to the second example embodiment of the present invention will be described. FIG. 22 is a flowchart illustrating the game processing executed by the game apparatus according to the second embodiment. Firstly, the CPU 10 detects the number of the controllers 7 connected to the game apparatus. Then, the detected number is set as the variable "m" (step S61).

Next, the CPU 10 reads a memory from the tagged text data 125. Then, based on the tagged text data 125, the CPU 10 generates a text to be displayed on the screen (step S62). At this time, mapping data showing a relationship between each ruby word and a display position associated therewith is generated and stored in the work area 127. Thereafter, the CPU 10 sets "1" as the variable "n" (step S63) and executes a voice transmission determination process (step S64).

FIG. 23 is a flowchart illustrating a detail of the voice transmission determination process shown in step S64 mentioned above. In FIG. 23, the CPU 10 firstly calculates the pointing coordinates of the controller n (step S71). Similarly to the first embodiment, this process is executed based on the operation data transmitted from the controller n.

Next, based on the aforementioned mapping data, the CPU 10 determines whether or not any of the ruby words is displayed at a pointing position on the screen indicated by the calculated pointing coordinates (step S72). That is, whether or not any of the ruby words is pointed to is determined. As a result, when it is determined that any of the ruby words is displayed at the pointing position, i.e., when it is determined that any of the ruby words is pointed to (YES in step S72), the CPU 10 further determines whether or not the ruby word pointed to in a current frame is different from one that was pointed to in a frame immediately preceding the current frame (in an immediately preceding processing loop) (step S73). As a result, when it is determined that the ruby word pointed to in the current frame is different from one that was pointed to in the frame immediately preceding the current frame (YES in step S73), the CPU 10 sets the transmitted flag 1283 "OFF" (step S74) and advances the process to step S75. On the other hand, when it is determined that the ruby word pointed to in the current frame is the same as one that was pointed to in the frame immediately preceding the current frame (NO in step S73), the CPU 10 skips step S74 and advances the process to step S75.

Next, the CPU 10 determines whether or not the transmitted flag 1283 is "ON" (step S75). As a result, when it is determined that the transmitted flag 1283 is "ON" (YES in step S75), the CPU 10 finishes the voice transmission determination process.

On the other hand, when it is determined that the transmitted flag 1283 is "OFF" (NO in step S75), the CPU 10 reads the tagged text data 125, thereby retrieving a character string (i.e., a pronunciation) sandwiched between the tags </> and </ruby> from a portion, including the ruby word, which is sandwiched by the tags <ruby> and </ruby> (step S76).

Then, based on the retrieved pronunciation, the CPU 10 generates the voice data by performing the voice synthesis (step S77). Subsequently, the CPU 10 transmits the generated voice data to the controller n (step S78). Thereafter, the CPU 10 sets the transmitted flag 1283 "ON" (step S79) and finishes the voice transmission determination process.

On the other hand, in step S72, when it is determined that any of the ruby words is not displayed at the pointing position, i.e., when it is determined that none of the ruby words are pointed to (NO is step S72), the CPU 10 determines whether or not the transmitted flag 128 of the controller n is "ON" (step S80). As a result, when it is determined that the transmitted flag 1283 is "OFF" (NO in step S80), the CPU 10 finishes the voice transmission determination process. On the other hand, when it is determined that the transmitted flag 1283 is "ON" (YES in step S80), the CPU 10 sets the transmitted flag 1283 "OFF" (step S81). Then, the CPU 10 transmits the voice output stop signal to the controller n (step S82). In the controller n which has received the voice output stop signal, the process for stopping voice outputted from the speaker 706 is executed. As such, the voice transmission determination process is finished.

Referring back to FIG. 22, subsequent to the voice transmission determination process, the CPU 10 determines whether or not the variable "n" equals the variable "m", thereby further determining whether or not the voice transmission determination process has been executed for all of the controllers (step S65). As a result, when it is determined that n=m is not satisfied (No in step 65), the CPU 10 adds "1" to "n" (step S66) and returns the process to step S63 to repeat the aforementioned process. When the voice transmission determination process has been executed for all of the controllers (YES in step S65), the CPU 10 executes the display process for displaying the game image (step S67). Thereafter, the CPU 10 determines whether or not the game is to be finished (step S68). When it is determined that the game is to be finished (YES in step S68), the game processing is to be finished. On the other hand, when it is determined that the game is not yet to be finished (NO in step S68), the CPU 10 returns the process to step S63 to repeat the aforementioned process. As such, the game processing according to the second embodiment is finished.

As described above, similarly to the first embodiment, even in the process executed for the game space using the two-dimensional coordinate system, when each of the players points to a predetermined word displayed on the screen, a pronunciation of the word is outputted, by voice, from the controller of each of the players. Thus, even when a plurality of sentences are displayed on the screen, a different word or sentence can be read aloud via the speaker of the controller of each of the players.

Note that in the voice transmission determination process, instead of the mapping table, a predetermined word dictionary may be used. In the word dictionary, at least a word and a pronunciation thereof are recorded. In this case, after the CPU 10 calculates the pointing coordinates, a scanning is performed in the left-right direction centering on the pointing coordinates, thereby detecting a character string located centering on the pointing coordinates. Then, the CPU 10 verifies the detected character string against the word dictionary. As a result, when it is verified that the detected character string corresponds to any of words stored in the word dictionary, a pronunciation of the word is retrieved from the word dictionary. Thereafter, the CPU 10 may generate the voice data based on the retrieved pronunciation by performing the voice synthesis so as to be transmitted to the controller 7. As such, even without using the predetermined tags mentioned above, it becomes possible to generate the voice data representing the aforementioned pronunciation and to transmit the generated voice data to the controller. Alternatively, storage means may be provided in the controller 7, and the voice data may be stored in the storage means. In this case, only data designating the voice data to be read is transmitted to the controller 7 where the voice synthesis is to be performed. Still alternatively, from among a plurality of languages, one language may be previously selected and stored, and the voice data corresponding to the language may be generated. Specifically, for example, a language flag indicating a selected language is stored in the flash memory 17 as game apparatus setting data or save data of the game, and the selected language can be changed according to a selection of a user. A plurality of types of voice represented by the tagged text data and of voice synthesis data, each type corresponding to each of the languages, may be stored, and one type of voice corresponding to the selected language may be retrieved based on the language flag, thereby generating the voice data. As such, a plurality of types of languages can be used. Therefore, example embodiments of the present invention are applicable to the case where the user does not understand a foreign language, for example. Furthermore, if such a language setting is stored and processed for each of the players, data corresponding to a language set by each of the players is read aloud via the controller of each of the players. Thus, it becomes possible to allow the users using languages different from each other to simultaneously play the game.

The game apparatus 3 according to example embodiments of the present invention is not limited to the embodiments described above. As the game apparatus 3, a game apparatus formed with a separately provided monitor, a game apparatus integrally formed with a monitor, a personal computer or a workstation which functions as a game apparatus by executing a game program or the like may also be used. Furthermore, the controller 7 according to example embodiments of the present invention is not limited to the embodiments described above. Only if means for outputting voice is provided, any other methods may be used for pointing to a position. For example, a display on the screen may be directly detected so as to determine a pointing position, or the markers may be provided in the controller such that a camera mounted at a position other than the controller picks up an image of the controller. Alternatively, an input device which moves a pointing position in accordance with a movement of the controller by means of the acceleration sensor, the gyro-sensor and the like may be used, or coordinates may be inputted by means of a mouse, a stick or a cross key. Still alternatively, an apparatus in which a speaker is provided with a pen used for a touch panel may be used.

Furthermore, example embodiments of the present invention are not limited to the game processing described above. Example embodiments of the present invention are applicable to the overall information processing such as reading aloud a text.

While example embodiments of the invention have been described in detail, the foregoing description is in all aspects illustrative and not restrictive. It is understood that numerous other modifications and variations can be devised without departing from the scope of the invention.

What is claimed is:

1. An information processing system comprised of a plurality of input devices and an information processing apparatus for executing a predetermined information processing based on an operation performed by a user using each of the plurality of input devices and for displaying an image in a display area of a display device based on the information processing, wherein each of the plurality of the input devices includes:

a speaker;

operation data transmitting programmed logic circuitry for transmitting operation data including pointing data designating a position in the display area based on a predetermined operation input;

voice data receiving programmed logic circuitry for receiving voice data representing voice to be outputted from the speaker from the information processing apparatus; and voice controlling programmed logic circuitry for outputting the voice from the speaker based on the received voice data, and the information processing apparatus includes:

voice storing area for storing predetermined voice data;

object displaying programmed logic circuitry for displaying at least one object associated with the predetermined voice data in the display area;

operation data acquiring programmed logic circuitry for acquiring the operation data for each of the plurality of input devices;

pointing position determining programmed logic circuitry for determining, for each of the plurality of input devices, a pointing position in the display area based on the pointing data included in the acquired operation data;

object specifying programmed logic circuitry for specifying, for each of the plurality of input devices, one of the at least one object displayed at the pointing position;

voice reading programmed logic circuitry for reading the voice data associated with the specified object;

voice data transmitting programmed logic circuitry for transmitting the voice data read by the voice reading programmed logic circuitry to each of the input devices pointing to the specified object;

pronunciation image generating programmed logic circuitry for generating an image displaying a full phonetic pronunciation of the character string representing the specified at least one object that is associated with the predetermined voice data; and pronunciation image displaying programmed logic circuitry for displaying the image displaying the full phonetic pronunciation of the character string in a vicinity of a display position of the specified object and configured to correspond to the voice data transmitted to the input device pointing to the specific object by the voice data transmitting programmed logic circuitry.

2. The information processing system according to claim 1, wherein the voice reading programmed logic circuitry includes voice synthesizing programmed logic circuitry for generating, for each of the plurality of input devices, synthesized voice data by performing voice synthesis based on the voice data read by the voice storing area, and the voice data transmitting programmed logic circuitry transmits the synthesized voice data generated by the voice synthesizing programmed logic circuitry to each of the plurality of input devices pointing to the specified object.

3. The information processing system according to claim 2, wherein the at least one object includes character data representing a character displayed in the display area, the voice storing area stores the voice reciting a pronunciation of the character represented by the character data, and the voice synthesizing programmed logic circuitry retrieves the voice reciting the pronunciation of the character represented by the character data included in the specified object from the voice storing area, and generates, as the synthesized voice data, synthesized voice reciting a predetermined character string composed of a plurality of characters by performing the voice synthesis based on the pronunciation of the character.

4. The information processing system according to claim 1, wherein each of the plurality of input devices further includes imaging programmed logic circuitry for picking up a predetermined imaging target, and the operation data transmitting programmed logic circuitry transmits, as the pointing data, data indicating a position at which the predetermined imaging target is shown in an image picked up by the imaging programmed logic circuitry.

5. The information processing system according to claim 1, wherein the operation data transmitting programmed logic circuitry transmits key data, included in the operation data, indicating that a predetermined key input operation is performed, and the information processing apparatus further includes:

detection programmed logic circuitry for detecting that the predetermined key input operation is performed based on the key data; and selection programmed logic circuitry for executing, when the predetermined key input operation is performed, a process for selecting one of the at least one object specified by each of the plurality of input devices in which the predetermined key input operation is performed, so as to be associated with the each of the plurality of input devices.

6. The information processing system according to claim 1, wherein the information processing apparatus further includes voice output stop signal transmitting programmed logic circuitry for transmitting, to each of the plurality of input devices, a voice output stop signal for stopping the voice being outputted from the each of the plurality of input device, when the pointing position of each of the plurality of input devices to which the voice data is transmitted by the voice data transmitting programmed logic circuitry indicates a position outside a display area of the specified object.

7. The information processing system according to claim 1, wherein the voice data transmitting programmed logic circuitry transmits the read voice data to each of the input devices pointing to the specified object so that the read voice data corresponding to the object displayed at the pointing position of each of the respective input devices is output from the speakers of respective input devices simultaneously.

8. The information processing system according to claim 1, further comprising:

pointing position image displaying programmed logic circuitry for displaying a pointing position image corresponding to each of the plurality of the input devices at the pointing position of each of the plurality of the input devices, and the pointing position image displaying programmed logic circuitry can simultaneously display a plurality of the pointing position images.

9. The information processing system according to claim 1, wherein the image displaying the full phonetic pronunciation of the character string in the vicinity of the display position of the specified object and corresponding to the voice data transmitted to the input device pointing to the specified object is displayed only while the voice data is being transmitted to the input device pointing to the specified object.

10. A computer-implemented method of instructing a computer of an information processing apparatus to execute a predetermined information processing based on operations performed by users respectively using a plurality of input devices and to display an image in a display area of a display device based on the information processing, each input device including a speaker; operation data transmitting programmed logic circuitry for transmitting operation data including pointing data designating a position in the display area of the display device; voice data receiving programmed logic circuitry for receiving voice data representing voice to be outputted from the speaker from the information processing apparatus; and voice controlling programmed logic circuitry for outputting the voice from the speaker based on the received voice data, wherein the method comprises:

displaying at least one object associated with predetermined voice data stored in a predetermined storage area;

acquiring the operation data for each of the plurality of input devices;

determining, for each of the plurality of input devices, a pointing position in the display area based on the pointing data included in the acquired operation data;

specifying, for each of the plurality of input devices, one of the at least one object displayed at the pointing position;

reading the voice data associated with the specified object from the voice storing area;

generating synthesized voice data by performing voice synthesis based on the read voice data;

transmitting the synthesized voice data to each of the plurality of input devices pointing to the specified object;

generating an image displaying a full phonetic pronunciation of the character string representing the specified at least one object that is associated with the predetermined voice data; and displaying the image displaying the full phonetic pronunciation of the character string in a vicinity of a display position of the specified object, the image configured to correspond to the synthesized voice data transmitted to each of the plurality of input devices pointing to the specific object.

11. The computer-implemented method according to claim 10, wherein said reading the voice data includes generating, for each of the plurality of input devices, synthesized voice data by performing voice synthesis based on the voice data read from the voice storing area, and said transmitting the voice data includes transmitting the synthesized voice data which has been generated to each of the plurality of input devices pointing to the specified object.

12. The computer-implemented method according to claim 11, wherein the at least one object includes character data representing a character displayed in the display area, the voice storing area stores the voice reciting a pronunciation of the character represented by the character data, and said generating the voice data includes retrieving the voice reciting the pronunciation of the character represented by the character data included in the specified object from the voice storing area, and generating, as the synthesized voice data, synthesized voice reciting a predetermined character string composed of a plurality of characters by performing the voice synthesis based on the pronunciation of the character.

13. The computer-implemented method according to claim 10, wherein each of the plurality of input devices picks up a predetermined imaging target, and the operation data transmitting programmed logic circuitry transmits, as the pointing data, data indicating a position at which the predetermined imaging target is shown in an image that has been picked up.

14. The computer-implemented method according to claim 10, wherein the operation data transmitting programmed logic circuitry transmits key data, included in the operation data, indicating that a predetermined key input operation is performed, and the information processing apparatus performs:

detecting that the predetermined key input operation is performed based on the key data; and executing, when the predetermined key input operation is performed, a process of selecting one of the at least one object specified by each of the plurality of input devices in which the predetermined key input operation is performed, so as to be associated with the each of the plurality of input devices.

15. The computer-implemented method according to claim 10, wherein the processsing executed by the information processing apparatus further comprises transmitting, to each of the plurality of input devices, a voice output stop signal for stopping the voice being outputted from the each of the plurality of input device, when the pointing position of each of the plurality of input devices to which the voice data is transmitted indicates a position outside a display area of the specified object.

16. The computer-implemented method according to claim 10, wherein the read voice data is transmitted to each of the input devices pointing to the specified object so that the read voice data corresponding to the object displayed at the pointing position of each of the respective input devices is output from the speakers of respective input devices simultaneously.

17. The computer-implemented method according to claim 10, further comprising:

displaying a pointing position image corresponding to each of the plurality of the input devices at the pointing position of each of the plurality of the input devices, wherein a plurality of the pointing position images are simultaneously displayed.

18. The computer-implemented method according to claim 10, wherein the image displaying the full phonetic pronunciation of the character string in the vicinity of the display position of the specified object and corresponding to the synthesized voice data transmitted to each of the plurality of input devices pointing to the specified object is displayed only while the synthesized voice data is being transmitted to the respective input device pointing to the specified object.

19. A non-transitory storage medium storing a program instructing a computer of an information processing apparatus to execute a predetermined information process based on operations performed by users respectively using a plurality of input devices and to display an image in a display area of a display device based on the information processing, each input device including a speaker; an operation data transmitter for transmitting operation data including pointing data designating a position in the display area of the display device; voice storing area for storing predetermined voice data; a voice designation data receiver for receiving voice designation data representing voice to be outputted from the speaker from the information processing apparatus; and a voice controller for retrieving the voice data corresponding to the received voice designation data from the voice storing area and for outputting the retrieved voice data from the speaker, wherein the process comprises:

displaying at least one object associated with the predetermined voice data in the display area;

acquiring the operation data for each of the plurality of input devices;

determining, for each of the plurality of input devices, a pointing position in the display area based on the pointing data included in the acquired operation data;

specifying, for each of the plurality of input devices, one of the at least one object displayed at the pointing position;

transmitting the voice designation data representing the voice data associated with the specified object to each of the plurality of input devices pointing to the specified object;

generating an image displaying a full phonetic pronunciation of the character string representing the specified at least one object that is associated with the predetermined voice data; and displaying the image displaying the full phonetic pronunciation of the character string in a vicinity of a display position of the specified object, the image configured to correspond to the voice designation data transmitted to each of the plurality of input devices pointing to the specified object.

20. The non-transitory storage medium according to claim 19, wherein said reading the voice data includes generating, for each of the plurality of input devices, synthesized voice data by performing voice synthesis based on the voice data read from the voice storing area, and said transmitting the voice data includes transmitting the synthesized voice data which has been generated to each of the plurality of input devices pointing to the specified object.

21. The non-transitory storage medium according to claim 20, wherein the at least one object includes character data representing a character displayed in the display area, the voice storing area stores the voice reciting a pronunciation of the character represented by the character data, and said generating the voice data includes retrieving the voice reciting the pronunciation of the character represented by the character data included in the specified object from the voice storing area, and generating, as the synthesized voice data, synthesized voice reciting a predetermined character string composed of a plurality of characters by performing the voice synthesis based on the pronunciation of the character.

22. The non-transitory storage medium according to claim 19, wherein each of the plurality of input devices picks up a predetermined imaging target, and the operation data transmitter transmits, as the pointing data, data indicating a position at which the predetermined imaging target is shown in an image that has been picked up.

23. The non-transitory storage medium according to claim 19, wherein the operation data transmitter transmits key data, included in the operation data, indicating that a predetermined key input operation is performed, and the information processing apparatus performs:

detecting that the predetermined key input operation is performed based on the key data; and executing, when the predetermined key input operation is performed, a process of selecting one of the at least one object specified by each of the plurality of input devices in which the predetermined key input operation is performed, so as to be associated with the each of the plurality of input devices.

24. The non-transitory storage medium according to claim 19, wherein the processing executed by the information processing apparatus further comprises transmitting, to each of the plurality of input devices, a voice output stop signal for stopping the voice being outputted from the each of the plurality of input device, when the pointing position of each of the plurality of input devices to which the voice data is transmitted indicates a position outside a display area of the specified object.

25. The non-transitory storage medium according to claim 19, wherein the read voice data is transmitted to each of the input devices pointing to the specified object so that the read voice data corresponding to the object displayed at the pointing position of each of the respective input devices is output from the speakers of respective input devices simultaneously.

26. The non-transitory storage medium according to claim 19, wherein:

the process further comprises displaying a pointing position image corresponding to each of the plurality of the input devices at the pointing position of each of the plurality of the input devices; and a plurality of the pointing position images are simultaneously displayed.

27. The non-transitory storage medium according to claim 19, wherein the image displaying the full phonetic pronunciation of the character string in the vicinity of the display position of the specified object and corresponding to the voice designation data transmitted to each of the plurality of input devices pointing to the specified object is displayed only while the voice designation data is being transmitted to the respective input device pointing to the specified object.

28. An information processing system comprised of a plurality of input devices and an information processing apparatus for executing a predetermined information processing based on an operation performed by a user using the plurality of the input devices and for displaying an image in a display area of a display device based on the information processing, wherein each of the plurality of the input devices includes:

a speaker;

voice storing area for storing predetermined voice data;

a computer configured to:

transmit operation data including pointing data designating a position in the display area based on a predetermined operation input;

receive voice designation data representing voice to be outputted from the speaker from the information processing apparatus; and retrieve the voice data corresponding to the received voice designation data from the voice storing area and for outputting the retrieved voice data from the speaker, and the information processing apparatus includes a processor configured to:

display at least one object associated with the predetermined voice data in the display area;

acquire the operation data for each of the plurality of input devices;

determine, for each of the plurality of input devices, a pointing position in the display area based on the pointing data included in the acquired operation data;

specify, for each of the plurality of input devices, one of the at least one object displayed at the pointing position;

transmit the voice designation data representing the voice data associated with the specified object to each of the plurality of input devices pointing to the specified object;

generate an image displaying a full phonetic pronunciation of the character string representing the specified at least one object that is associated with the predetermined voice data; and display the image displaying the full phonetic pronunciation of the character string in a vicinity of a display position of the specified object, the image configured to correspond to the voice designation data transmitted to each of the plurality of input devices pointing to the specified object.

29. The information processing system according to claim 28, further comprising:

pointing position image displaying programmed logic circuitry for displaying a pointing position image corresponding to each of the plurality of the input devices at the pointing position of each of the plurality of the input devices, and the pointing position image displaying programmed logic circuitry can simultaneously display a plurality of the pointing position images.

30. The information processing system according to claim 28, wherein the image displaying the full phonetic pronunciation of the character string in the vicinity of the display position of the specified object and corresponding to the voice designation data transmitted to each of the plurality of input devices pointing to the specified object is displayed only while the voice designation data is being transmitted to the respective input device pointing to the specified object.

* * * * *